United States Patent
Eguchi et al.

(10) Patent No.: US 6,810,112 B1
(45) Date of Patent: Oct. 26, 2004

(54) METHOD AND APPARATUS FOR TESTING AN INFORMATION NOTIFICATION SERVICE

(75) Inventors: Nobuhiko Eguchi, Fukuoka (JP); Katsuhiko Yamatsu, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 674 days.

(21) Appl. No.: 09/679,978

(22) Filed: Oct. 5, 2000

(30) Foreign Application Priority Data

Oct. 6, 1999 (JP) .......................................... 11-285012

(51) Int. Cl.⁷ .............................................. H04M 1/24
(52) U.S. Cl. ...................... 379/9; 379/1.01; 379/10.03; 379/26.01; 379/142.01
(58) Field of Search ........................ 379/1.01, 9, 9.01, 379/9.06, 10.03, 15.01, 15.03, 18, 26.01, 29.01, 29.02, 29.06, 142.01; 375/224, 302, 303, 309, 322, 323, 324, 325, 326, 334, 335, 336, 337, 340, 342

(56) References Cited

U.S. PATENT DOCUMENTS

| | | | | |
|---|---|---|---|---|
| 4,115,738 A | * | 9/1978 | Mitarai et al. | 329/303 |
| 4,551,846 A | * | 11/1985 | Takeda et al. | 375/328 |
| 4,570,126 A | * | 2/1986 | Demmer et al. | 329/327 |
| 5,337,051 A | * | 8/1994 | Tsui | 342/13 |
| 5,343,516 A | * | 8/1994 | Callele et al. | 379/93.05 |
| 5,463,670 A | * | 10/1995 | Chiang et al. | 379/27.04 |
| 5,857,011 A | * | 1/1999 | Kennedy et al. | 379/29.06 |
| 5,909,544 A | * | 6/1999 | Anderson et al. | 709/208 |
| 5,937,034 A | * | 8/1999 | Kennedy et al. | 379/29.06 |
| 6,160,857 A | * | 12/2000 | Yang | 375/334 |
| 6,201,854 B1 | * | 3/2001 | Avitsur et al. | 379/27.01 |
| 6,215,854 B1 | * | 4/2001 | Walance | 379/21 |
| 6,272,184 B1 | * | 8/2001 | Ta et al. | 375/334 |

FOREIGN PATENT DOCUMENTS

| | | |
|---|---|---|
| JP | 9-233135 | 9/1997 |
| JP | 9-233137 | 9/1997 |
| JP | 9-284117 | 10/1997 |

* cited by examiner

Primary Examiner—Quoc Tran
(74) Attorney, Agent, or Firm—Katten Muchin Zavis Rosenman

(57) ABSTRACT

A testing method is used to perform a test of an information notification service function of a switching apparatus which can provide the information notification service in compliance with a predetermined information notification service specification. The testing method comprises a step of performing an information notification service function between a testing apparatus which can emulate a plurality of types of information reception terminals for different information notification service specifications and the switching apparatus which can connect a subscriber side two-wire in a subscriber line circuit in the switching apparatus to the testing apparatus.

19 Claims, 24 Drawing Sheets

FIG. 6

| SIGNAL NAME | BIT REPRESENTATION | REMARKS |
|---|---|---|
| MARK BIT | SEQUENCE OF ONE | MORE THAN 60ms |
| CONTROL SIGNAL | B7~B1 | FUNCTIONS |
| DLE | 0010000 | CONTROL SIGNAL FOR TRANSPARENT MODE |
| SOH | 0000001 | START OF HEADING OF INFORMATION |
| HEADER | 0000111 | SENDING INFORMATION FROM SWITCHING APPARATUS TO TERMINAL (BIN) |
| STX | 0000010 | START OF TEXT AND END OF HEADING |
| SERVICE TYPE | 1000000 | INFORMATION NOTIFICATION SERVICE BEFORE COMMUNICATION |
| MESSAGE CONTENTS LENGTH | 0000001~1110101 | TOTAL BYTES OF PARAMETER (1)~(n) (BIN) |
| PARAMETER TYPE | | (BIN) |
| INFORMATION CONTENTS LENGTH | | BYTE NUMBER OF PARAMETER (BIN) |
| INFORMATION CONTENTS | | (CHARACTER PRESENTATION) |
| FTX | 0000011 | END OF TEXT |
| SI | 0001111 | USE OF ROMAN ALPHABET FOR FIGURE |
| SO | 0001110 | USE OF KATAKANA FOR FIGURE |
| CRC | | 16 BIT CRC RESULT |

FIG. 7
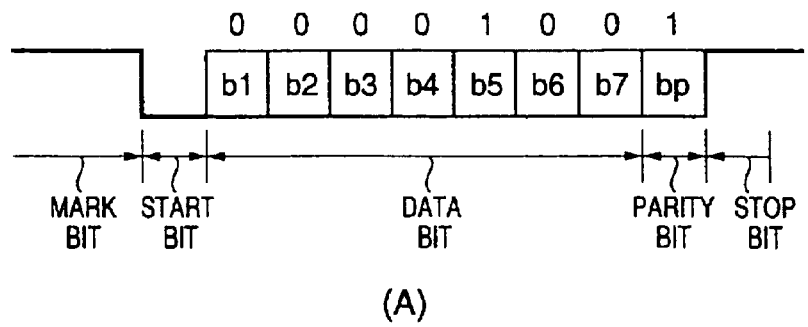
(A)
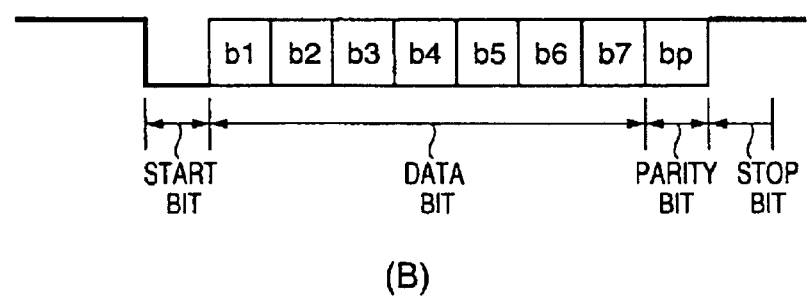
(B)
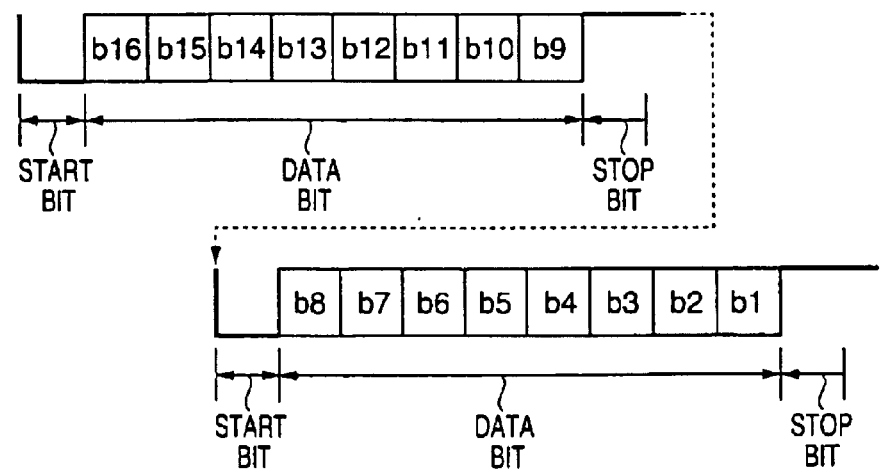
(C)

FIG. 9
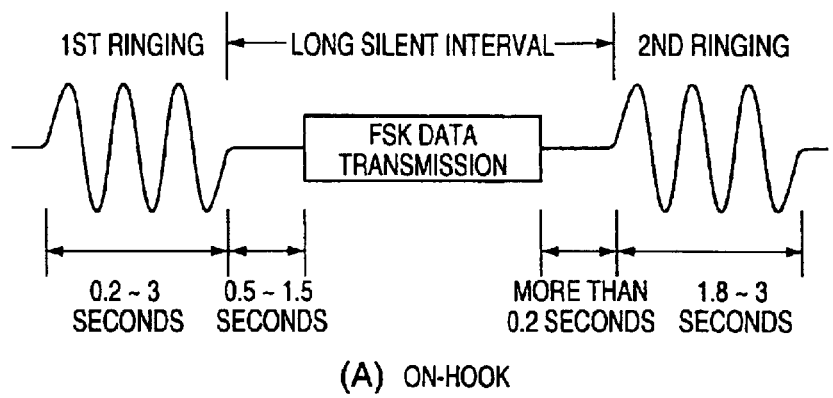
(A) ON-HOOK
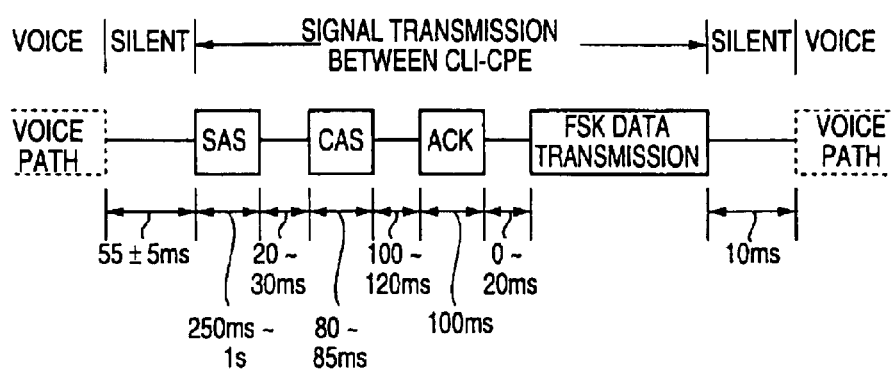
(B) OFF-HOOK

FIG. 12
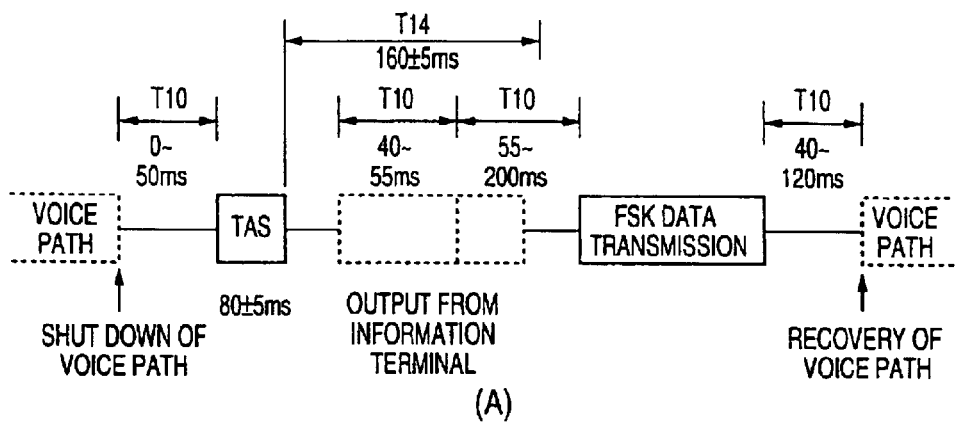
(A)
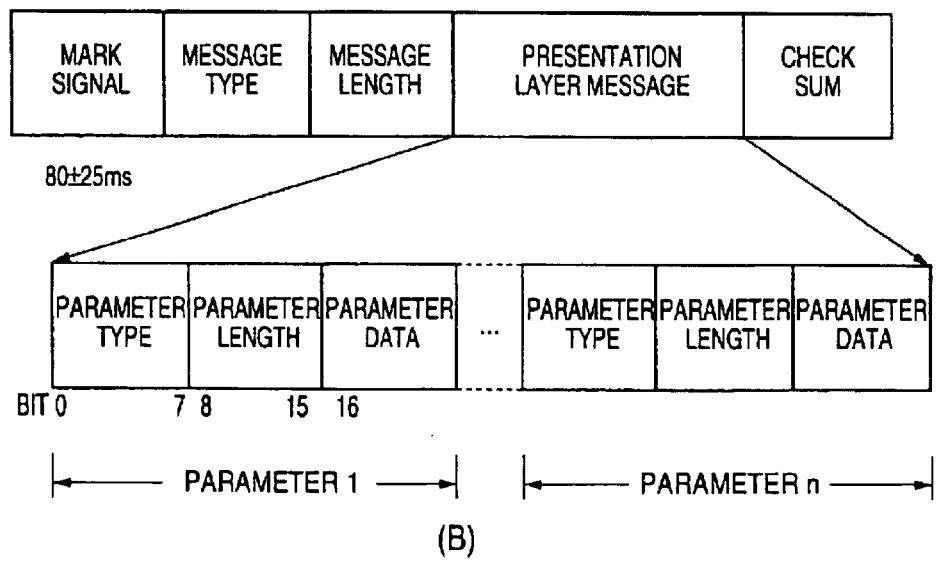
(B)
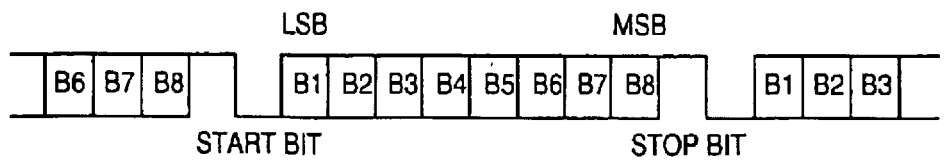
(C)

FIG. 17
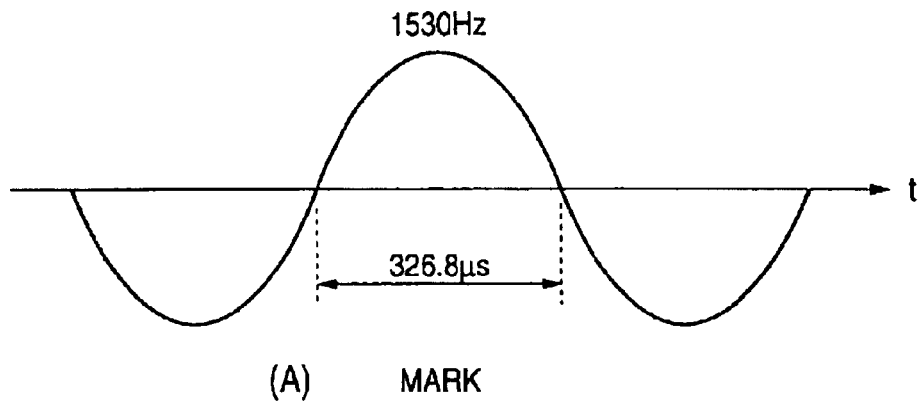
(A)  MARK
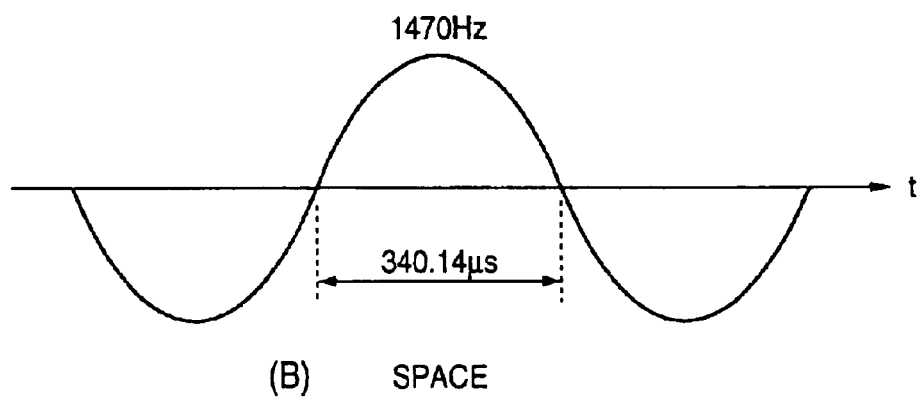
(B)  SPACE
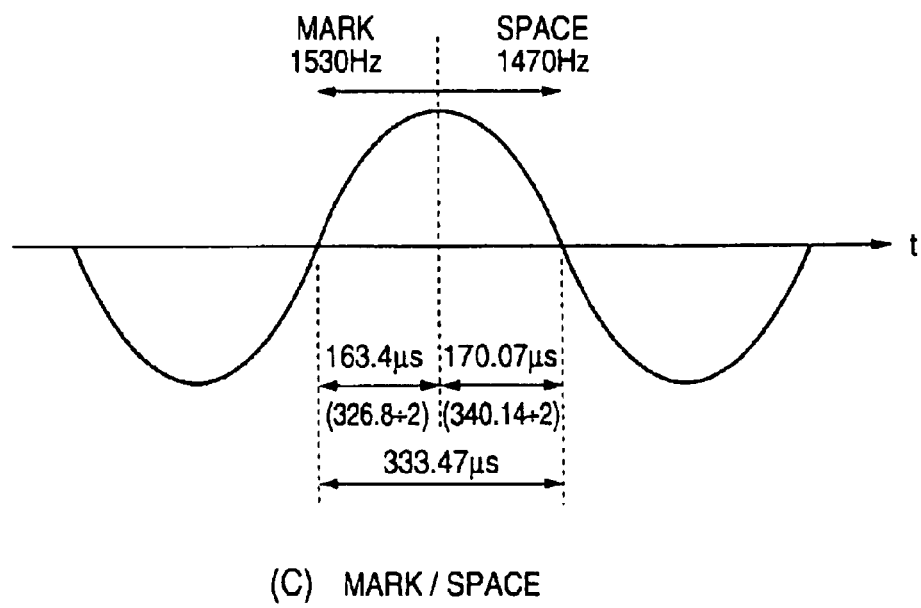
(C)  MARK / SPACE

METHOD AND APPARATUS FOR TESTING AN INFORMATION NOTIFICATION SERVICE

BACKGROUND OF THE INVENTION

1. Field of the Invention

The present invention generally relates to a method and an apparatus for testing an information notification service, and more particularly to a method and an apparatus for testing an information notification service using a voice band data transmission interface for an analog subscriber of a switching apparatus.

2. Description of the Related Art

Recently, so-called the information notification service using a voice band data transmission interface for an analog subscriber is world-wide spreading. In Japan, NTT (Nippon Telephone and Telegram) provides the information notification service (Number Display) using telephone lines. The information notification services, such as a VDTI (Voiceband Data Transmission Interface) provided by Bellcore and a CLIP-A (Calling Line Identification Presentation for Analog Lines) provided by ETSI (European Telecommunication Standard Institute) are also standardized.

Therefore, it is important to provide services stably and to enhance service quality and to achieve a test method and technology for detecting a fault quickly.

Conventionally, a voice band data transmission interface test system for the switching apparatus has been described in a prior art, for example, Japanese Patent application Number 09284117. In the prior art, a dedicated test apparatus which tests the information notification for only one specification (Bellcore specification) is described.

Recently, the switching apparatuses are wild-wide exported. Therefore, the switching apparatus has to be equipped with an information notification service function according to the specification of a country to which the switching apparatus are exported. Therefore, it is not cost-effective to design and produce each test apparatus which only meets one specification for testing each of the information notification service at the production site, and furthermore, it is complicated for user for maintenance of the system.

SUMMARY OF THE INVENTION

It is a general object of the present invention to provide a method and an apparatus for testing an information notification service, in which the above disadvantages are eliminated.

A more specific object of the present invention is to provide a method and an apparatus for testing an information notification service, which can efficiently test various information notification service function with a simple construction.

The above objects of the present invention are achieved by a testing method which is used to perform a test of an information notification service function of a switching apparatus which can provide the information notification service in compliance with a predetermined information notification service specification. The testing method comprises a step of performing an information notification service function between a testing apparatus which can emulate a plurality of types of information reception terminals for different information notification service specifications and switching apparatus which can connect a subscriber side two-wire in a subscriber line circuit in the switching apparatus to the testing apparatus.

According to the invention, it is possible to effectively test the information notification service function of the switching apparatus which can provide the information notification service in compliance with a predetermined information notification service specification using a simple testing apparatus.

BRIEF DESCRIPTION OF THE DRAWINGS

Other objects, features and advantages of the present invention will become more apparent from the following detailed description when read in conjunction with the accompanying drawings, in which:

FIG. 6 shows the NTT specification of the information notification service;

FIG. 7 shows the NTT specification of the information notification service;

FIG. 9 shows the Bellcore specification of the information notification service;

FIG. 12 shows the ETSI specification of the information notification service;

FIG. 17 shows an FSK signal which is described in the prior art;

DESCRIPTION OF THE PREFERRED EMBODIMENTS

Figure 1:
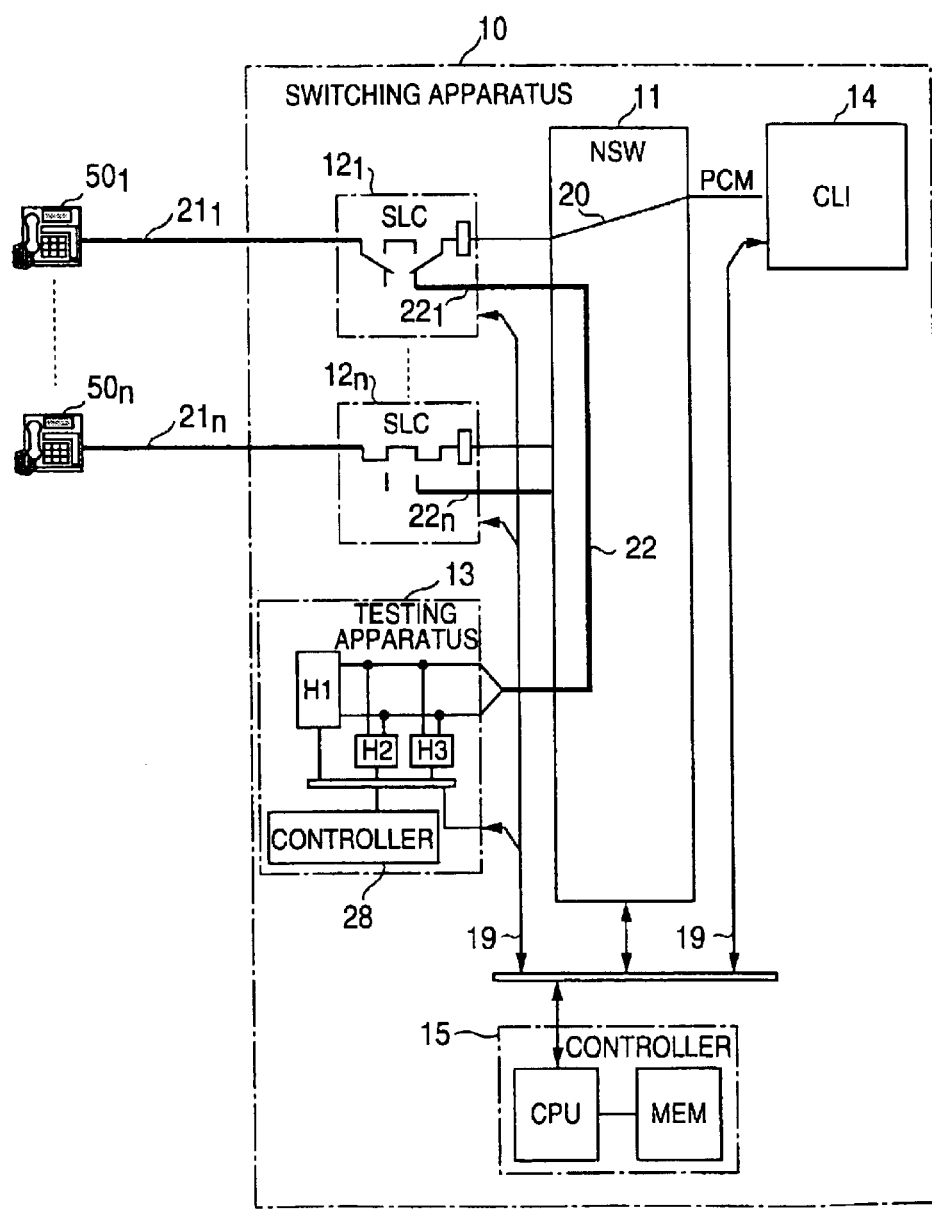
FIG. 1 shows a principle of the present invention.

Next, an embodiment according to the present invention will be explained. The same reference numerals show the same component.

A first embodiment according to the present invention will be explained.

FIG. 1 shows a principle of the present invention.

In FIG. 1, a system for testing has a switching apparatus 10, subscriber information reception terminals (analog telephones) 50, subscriber lines of a metallic two-wire 21, a network switch (NSW) 11, subscriber line circuits (SLC) 12, a test access relay 12a, a subscriber circuit 12b, a testing apparatus 13 which can emulate information reception terminals for a plurality of specifications, a called line identification output apparatus 14 with a voice band data transmission interface which can output an FSK signal, a controller 15 which controls main functions, such as a call control and the information notification service control and its testing of the switching apparatus, a control bus 18, a signal line (SCAN-SD) 19 which is used to communicate signaling information between the controller and blocks, such as the SLC 12, a call line 20 which carries PCM voice data including the FSK data, a test line 22 of the subscriber circuit 12. For a test of the information notification service function in the information reception terminal $50_1$ first, the call line 20 is connected the test line $22_1$, so that the call line 20 is connected to the testing apparatus 13. Then, the testing apparatus 13 emulates the information reception terminal $50_1$ of the destination and the test of the information notification service function is performed.

Figure 2:
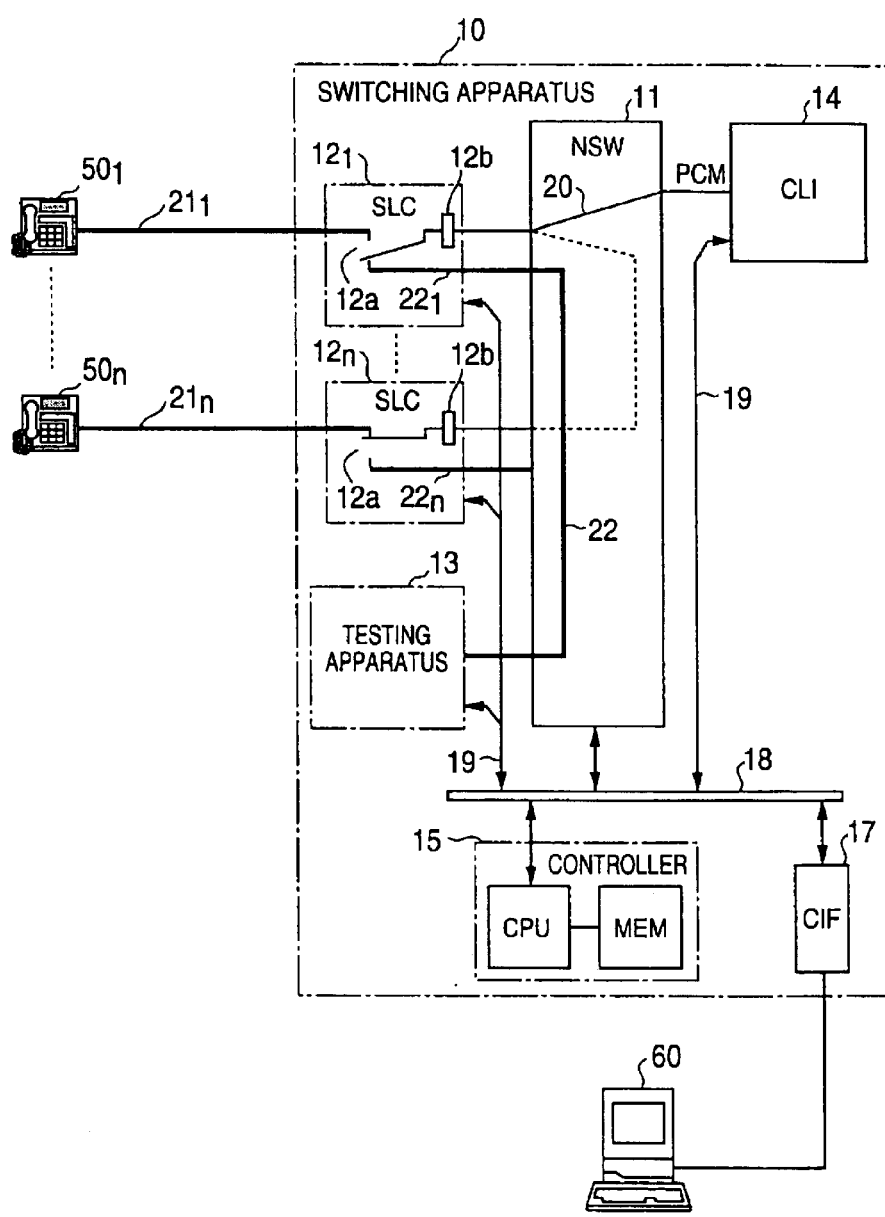
FIG. 2 shows an information notification service test method of a first embodiment according to the present invention.

FIG. 2 shows an information notification service test method of a first embodiment according to the present invention. In this embodiment, it is possible to test the information notification services for a plurality of specifications, such as the NTT, the Bellcore, the ETSI, and so on.

In FIG. 2, a communication interface 17 and a console 60 to execute and manage the information notification service test are added to the construction as shown in FIG 1.

The switching apparatus 10 is normally produced to comply with a predetermined specification as well as the information notification service function. The switching apparatus 10 provides the information reception terminal with the information notification service for the predetermined specification of a destination. This embodiment of the present invention can efficiently test the information notification service function when the switching apparatus 10 employs any information notification service function.

The controller 15 of the switching apparatus 10 has a software for testing the information notification service function for the predetermined specification, or the software for testing the information notification service function is downloaded by the console 60. On the other hand, the test apparatus 13 has a minimum hardware circuit to test the information notification service function for the plurality of specifications and the testing software to control the minimum hardware circuit to adapt the specifications. The testing software in the test apparatus 13 is selected by means of the a specification information or an instruction issued by the switching apparatus 10, or is downloaded from the switching apparatus 10.

For testing the information notification service function for the information reception terminal $50_1$, first, the test access relay 12a in the subscriber line circuit $12_1$ is activated under a control of the console 60. As a result, a subscriber line of a subscriber circuit 12b is connected to the test line $22_1$, so that the subscriber circuit 12b is connected to the testing apparatus 13. Then, the testing apparatus 13 emulates the information reception terminal $50_1$ of the destination and the test of the information notification service function is performed. As a result, the components of the switching apparatus 10, such as the CLI 14, the NWS 11 and the SLC $12_1$, which are necessary for the information notification service, are tested efficiently without using the subscriber information reception terminal $50_1$.

Figure 3:
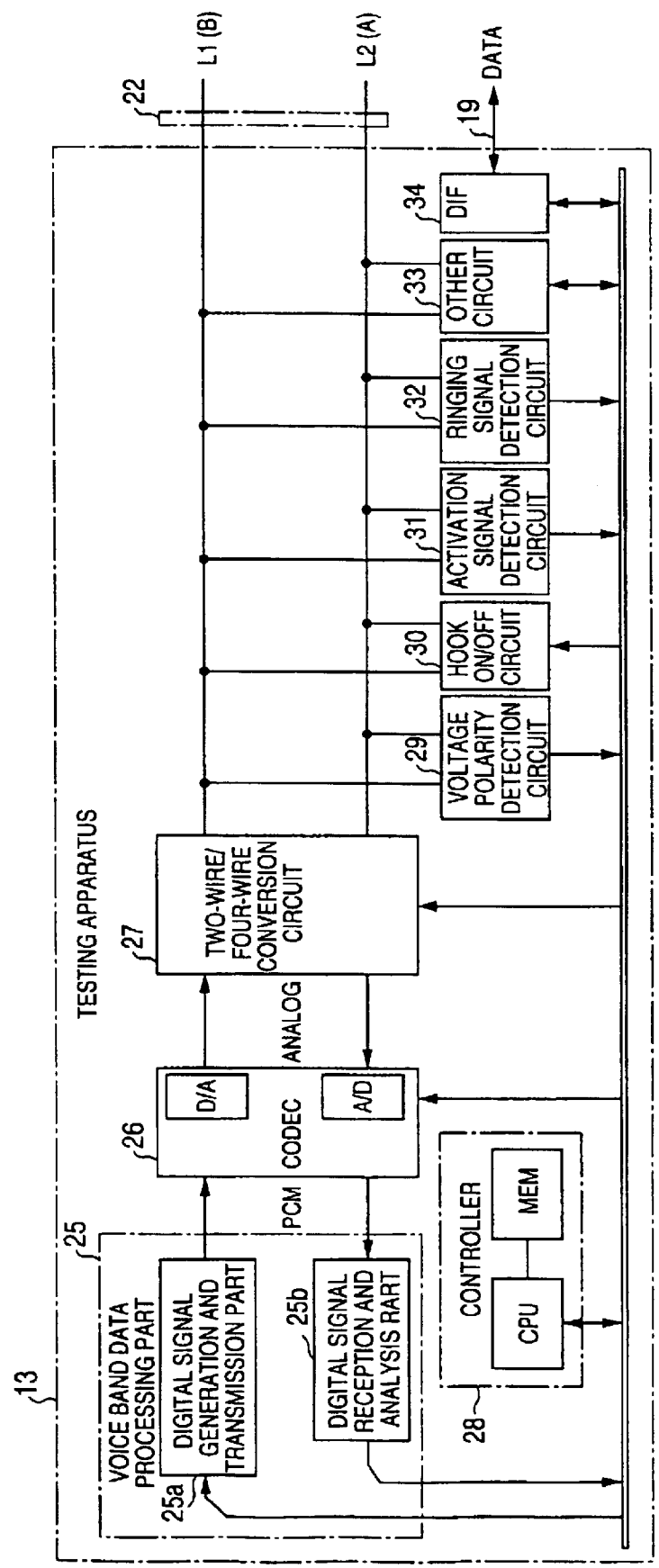
FIG. 3 shows a block diagram of a test apparatus of the first embodiment according to the present invention.

FIG. 3 shows a block diagram of the testing apparatus 13 of the first embodiment shown in FIG. 2 according to the present invention. This test apparatus can emulate the information reception terminal for a plurality of the specifications, such as the NTT specification, the Bellcore specification and the ETSI specification. The testing apparatus 13 as shown in FIG. 3 has a voice band data processing part 25 which generates, transmits, receives and analyzes the voice band data, such as the PCM data and an PSK information notification data, a digital signal generation and transmission part 25a, a digital signal reception and analysts part 25b, a codec 26 to make a conversion between the PCM data and an analog voice signal, an A/D converter, a D/A converter, a two-wire/four-wire conversion circuit 27, a controller 28 to control the testing apparatus 13 for emulation of the information reception terminal 50 and notification of a test result, a power polarity (normal/reversal) detection circuit 29 for the test line 22, an on-hook/off-hook circuit 30 which makes the test line 22 in the on-hook state to disconnect a DC loop or the off-hook state to connect the DC loop, an activation signal detection circuit 31 to detect the activation signal for the information reception circuit, a ringing signal detection circuit 32, other circuits 33 which is provided to exchange various control signals and a digital interface 34 connected to the signal line 19 of the switching apparatus 10. Most of these circuits are used for the plurality of the specifications, however, the on-hook/off-hook circuit 30 and the activation signal detection circuit 31 are only for the NTT specification.

The codec 26 has the same function as that of the normal codec in the subscriber circuit 12b as shown in FIG. 2. When the voice band signal is transmitted, the PCM voice signal from the digital signal generation and transmission part 25a is converted into an analog signal and the analog signal is output to the two-wire/four-wire conversion circuit 27. On the other hand, the analog signal from the two-wire/four-wire conversion circuit 27 is converted into the digital signal by the A/D, and the digital signal is output to the digital signal reception and analysis part 25b. The PCM conversion rules, such as an A-law and a $\mu$-law comply with the specifications.

On the other hand, when the FSK signal is exchanged, the FSK information data from the digital signal generation and transmission part 25a is converted into an analog FSK signal and the analog signal is output to the two-wire/four-wire conversion circuit 27. The analog FSK signal from the two-wire/four-wire conversion circuit 27 is converted into the FSK information data by the A/D, and the FSK information data is supplied to the digital signal reception and analysis part 25b.

The two-wire/four-wire conversion circuit 27 can select a subscriber termination impedance according to an instruction from the controller 28 to meet the specification.

The controller 28 is preferably constructed by a microprocessor (CPU) or a programmable device, such as an FPGA, to adapt the plurality of the specifications. Theses devices have flexibility to change the processing according to the software instruction or station data issued by the switching apparatus, or to meet the test specification of the destination.

The voice band data processing part 25 is preferably constructed by a DSP (digital signal processor) or a programmable device, such as the FPGA, to adapt the plurality of the specifications. These devices also have flexibility to change the processing according to the software instruction or station data issued by the switching apparatus. Furthermore, it is possible for these devices to adapt the test, such as a measurement of a frequency and a signal level by downloading the DSP execution program or circuit information of the FPGA. As a result, it is possible to efficiently use the testing apparatus 13 for testing the information notification service for a plurality of the specifications.

Figure 4:
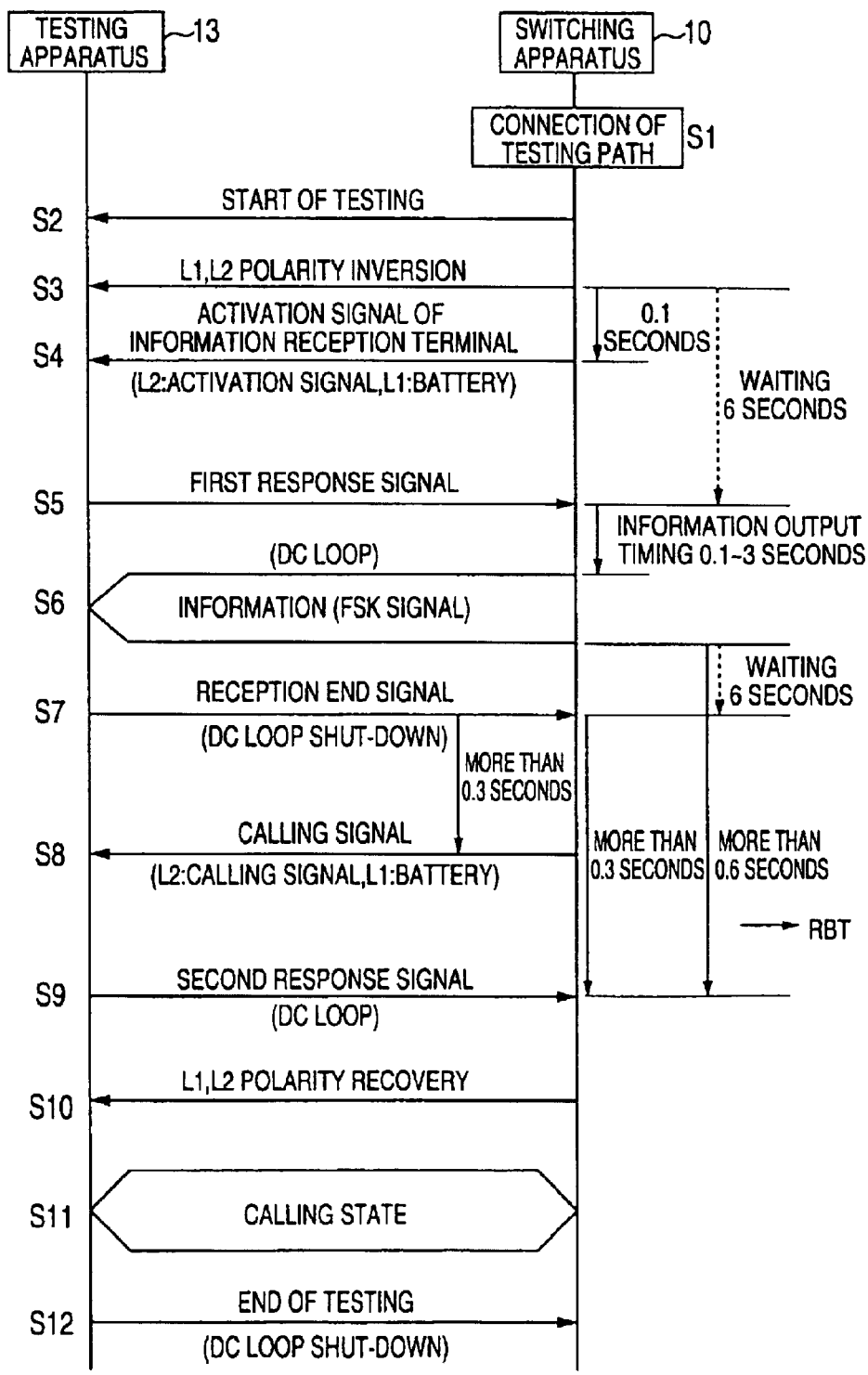
FIG. 4 shows a test sequence of the information notification service for an NTT specification.

FIG. 4 shows a test sequence of the notification service (for example, on-hook transmission) for the NTT specification. FIG. 4 shows a case where the testing apparatus 13 emulates the information reception terminal for the NTT specification. The controller 15 of the switching apparatus 10 is referred to the switching apparatus 10 in the description below.

In a step S1, the switching apparatus 10 connects a testing path as shown in FIG. 2. First, the test access relay 12a in the subscriber line circuit $12_1$, is activated. As a result, the call line 20 is connected to the test line $22_1$, so that the call line 20 is connected to the testing apparatus 13. On the other hand, the testing apparatus 13 determines to perform the test for the NTT specification based on the station data and the instruction with the test start instruction supplied from the switching apparatus. Then, the controller 28 selects the termination impedance of the two-wire/four-wire conversion circuit 27 to meet the NTT specification. Next, the test line 22 is set to the on-hook state in which the DC loop is shut down.

In a step S2, the switching apparatus 10 sends a start of testing signal to the testing apparatus 13 through the signal line 19. In a step S3, the switching apparatus 10 inverts the power polarity. In the testing apparatus 13, the power polarity detection circuit 29 detects a reversal of the polarity, then notifies it to the controller 28. In a step S4, the switching apparatus 10 sends an activation signal of the information reception terminal after a predetermined interval (for example, 0.1 second) is passed. Then, in the testing apparatus 13, the activation signal detection circuit 31 detects the activation signal and notifies it to the controller 28. The controller monitors the interval (0.1 second) between the notification of the reversal of the polarity and the notification of the activation signal. This interval is one item of the testing.

In a step S5, the testing apparatus 13 instructs the on-hook/off-hook circuit 30 to be hooked off after a predetermined time is passed since the reception of the activation signal of the information reception terminal and forms the DC loop as a first response signal. The controller 15 of the switching apparatus 10 monitors the interval (at most 6 second) between the sending of the reversal of the polarity and the reception of the first response signal. This interval is also one item of the testing.

In step S6, a called line identification output apparatus 14 sends the predetermined FSK information data. The data is converted into the FSK signal by the subscriber circuit $12_1$, and is input to the testing apparatus 13. The FSK signal of the NTT specification is as follows.
Transmission rate: 1200 baud;
Characteristics frequency: 1700 Hz+/−10 Hz;
Logical one (mark): 1300 Hz+/−20 Hz;
Logical zero (space): 2100 Hz+/−20 Hz;
Output level: −14 dBm to −32 dBm;
Parity bit: even parity.

Figure 5:
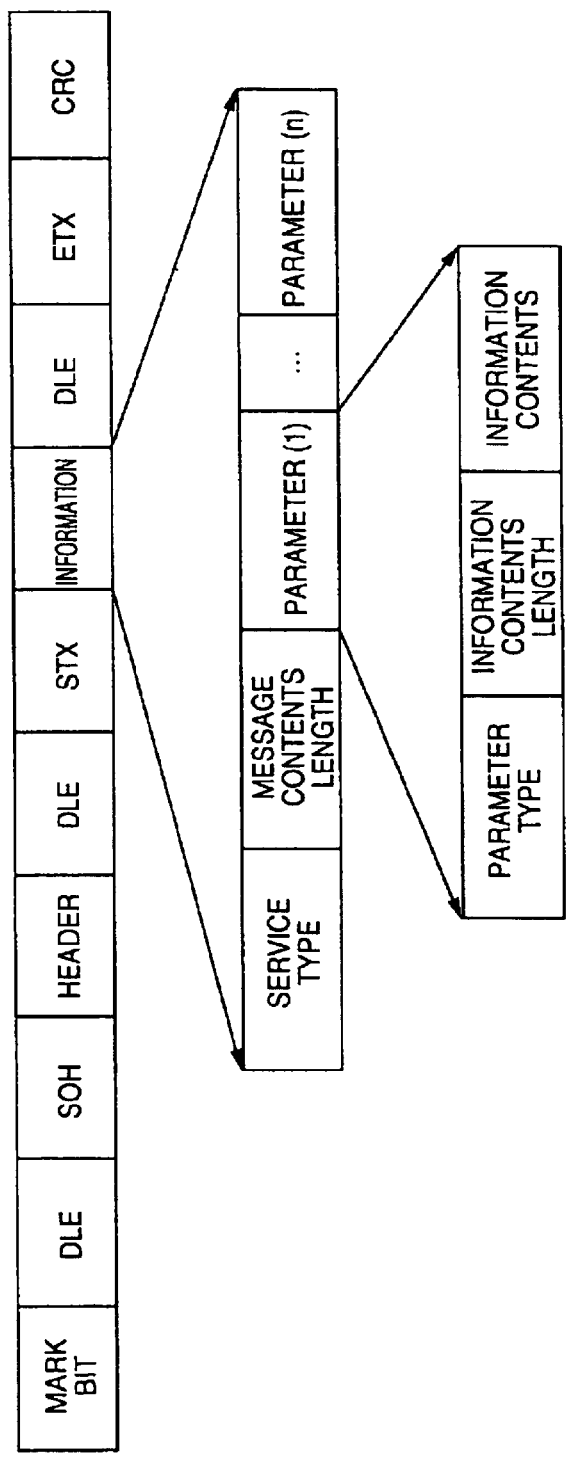
FIG. 5 shows the NTT specification of the information notification service.

FIG. 5 to FIG. 7 show the NTT specification of the information notification service. FIG. 5 shows an information data format using the FSK signal. FIG. 6 shows meaning of each bit of the control signals shown in FIG. 5. FIG. 7 shows a transmission sequence for each type of the information data.

In the testing apparatus 13, the FSK signal is converted into the PCM data. Then, the digital signal reception and analysis part 25b analyzes the characteristics, such as a signal level, a transmission rate and a frequency, of the received signal and a contents of the received signal. Then, the estimation for the test items are performed. After the reception operation is completed, the digital signal reception and analysis part 25b determines whether the on-hook transmission function is proper, then notifies the result to the controller 28. In step S7, the testing apparatus 13 instructs the on-hook/off-hook circuit 30 to be hooked on and shuts down the DC loop as a signal indicating an end of reception.

In a step S8, the switching apparatus sends a ringing signal to the testing apparatus 13. In the testing apparatus 13, the ringing signal detection circuit 32 detects the ringing signal and notifies it to the controller 28. In a step S9, the testing apparatus 13 instructs the on-hook/off-hook circuit 30 to be hooked off and forms the DC loop as a second response signal. In the step S10, the switching apparatus change the power polarity from a reverse polarity to a regular polarity. In the testing apparatus 13, the power polarity detection circuit 29 detects the regular polarity and notifies it to the controller 28. In a step S11, the switching apparatus 10 and the test apparatus 13 are in a calling state. As described above, it is determined whether the information notification service function is proper or not and the test is completed. In a step S12, the testing apparatus 13 instructs the on-hook/off-hook circuit 30 to be hooked on and shuts down the DC loop.

In case that the switching apparatus 10 and the test apparatus 13 are in a calling state in a step S11, it is possible to finish testing after a function of voice data transmission and reception are confirmed. It is possible to test the voice data transmission and reception by means of sending a test tone signal from the switching apparatus 10 to the testing apparatus 13 and sending a test tone signal from the testing apparatus 13 to the switching apparatus 10. When the test tone signals are properly received by each of the testing apparatus 13 and the switching apparatus 10, the function of the voice data transmission and the reception is admitted to be correctly operating.

Figure 8:
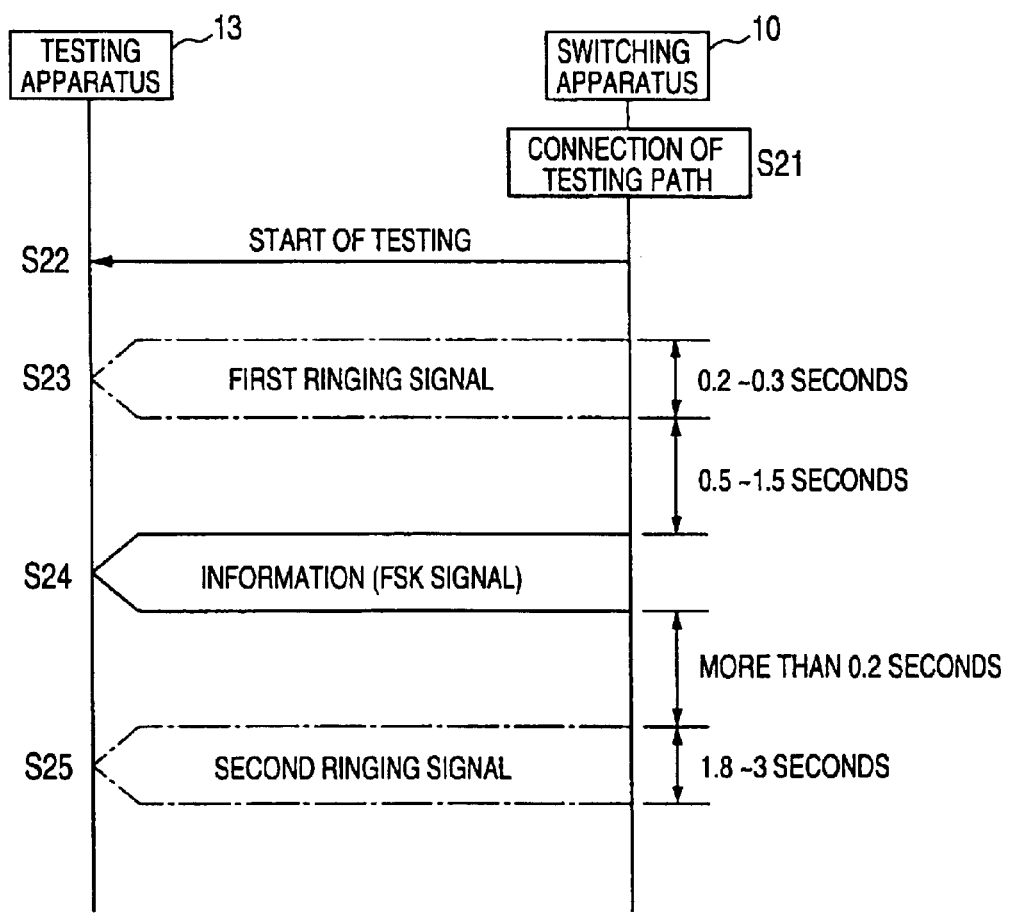
FIG. 8 shows a test sequence of the information notification service for a Bellcore specification.
Figure 10:
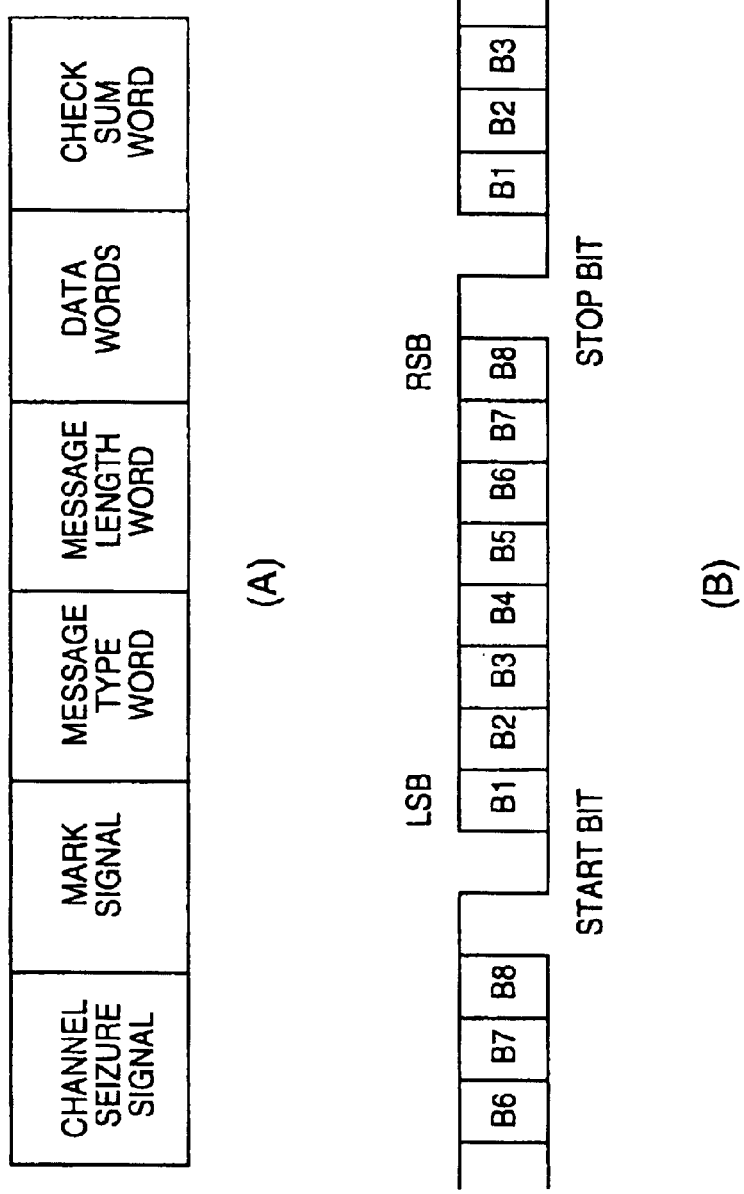
FIG. 10 shows the Bellcore specification of the information notification service.

FIG. 8 shows a test sequence of the information notification service for the Bellcore specification. This is a case where the testing apparatus 13 as shown in FIG. 2 emulates the information reception terminal for the Bellcore specification in which an on-hook transmission is employed. FIG. 9 and FIG. 10 show the Bellcore specification of the information notification service. FIG. 9(A) shows the Bellcore specification for the on-hook transmission and FIG. 9(B) shows the Bellcore specification for the off-hook transmission. FIG. 10(A) shows an information data format using FSK signal (a single data message format) and FIG. 10(B) shows an output format of the information data. The Bellcore specification also has a multi data message format. The testing apparatus 13 can also handle the multi data message format by means of only changing a program.

As shown in FIG. 9(A), the FSK data are transmitted during long silent interval between a first ringing interval and a second ringing interval in case of the on-hook transmission of the Bellcore specification. In a step S21 as shown in FIG. 8, the switching apparatus 10 connects a testing path as shown in FIG. 2. On the other hand, the testing apparatus 13 determines to perform the test for the Bellcore specification based on the station data and the instruction with the test start instruction supplied from the switching apparatus. Then, the controller 28 selects the termination impedance of the two-wire/four-wire conversion circuit 27 to meet the Bellcore specification. Next, the test line 22 is set to the on-hook state in which the DC loop is shut down.

In a step S22, the switching apparatus 10 send a start of testing signal to the testing apparatus 13 through the signal line 19. In a step S23, the switching apparatus 10 sends a first ringing signal to the testing apparatus 13. The ringing signal detection circuit 32 of the testing apparatus 13 detects the first ringing signal and notifies it to the controller 28. In a step S24, the information signal is sent from the switching apparatus 10 using the voice band signal (FSK signal). The FSK signal of the Bellcore specification is as follows.
Transmission rate: 1200 baud+/−12 baud;
Characteristics frequency: 1700 Hz;
Logical one (mark): 1200 Hz+/−10%;
Logical zero (space): 2200 Hz+/−10%;
Output level: −13.5+/−1 dBm.

In the testing apparatus 13, the FSK signal is converted into the PCM data. Then, the digital signal reception and analysis part 25b analyzes the characteristics, such as a signal level, a transmission rate and a frequency of the received signal and a contents of the received signal. Then, the estimation for the test items are performed. After the reception operation is completed, the digital signal reception and analysis part 25b determines whether the on-hook transmission function is proper, then notifies the result to the controller 28.

In a step S25, the switching apparatus 10 sends a second ringing signal to the testing apparatus 13. The ringing signal detection circuit 32 of the testing apparatus 13 detects the second ringing signal and notifies it to the controller 28. As described above, it is determined whether the information notification service function is proper or not and the test is completed. As not shown in FIG. 8, the testing apparatus 13 can finish testing such that the testing apparatus 13 changes its state to the off-hook state, and then returns its state to the on-hook state after predetermined interval is passed. When the testing apparatus changes its state to the off-hook state, the switching apparatus 10 and the test apparatus 13 are in a calling state. Therefore, it is also possible to finish testing after a function of voice data transmission and reception are confirmed as described in the embodiment for the NTT specification.

FIG. 9(B) shows the Bellcore specification for the off-hook transmission. The FSK signal is transmitted in the off-hook transmission. Therefore, it is needed to disconnect the calling path which is once connected. Next, the CLI 14 of the switching apparatus sends a subscriber ringing signal SAS, a ringing signal CAS of a subscriber information display apparatus. Then, the testing apparatus 13 returns a acknowledge signal ACK to the switching apparatus 10. Next, the CLI 14 of the switching apparatus sends an information data using the FSK signal. Then, the calling path is recovered. The testing apparatus 13 can also emulate the off-hook transmission if the testing apparatus 13 is provided a reception function of the SAS signal and the CAS signal, a transmission function of the ACK signal In the voice band data processing part 25, and a processing software in the controller 28.

Figure 11:
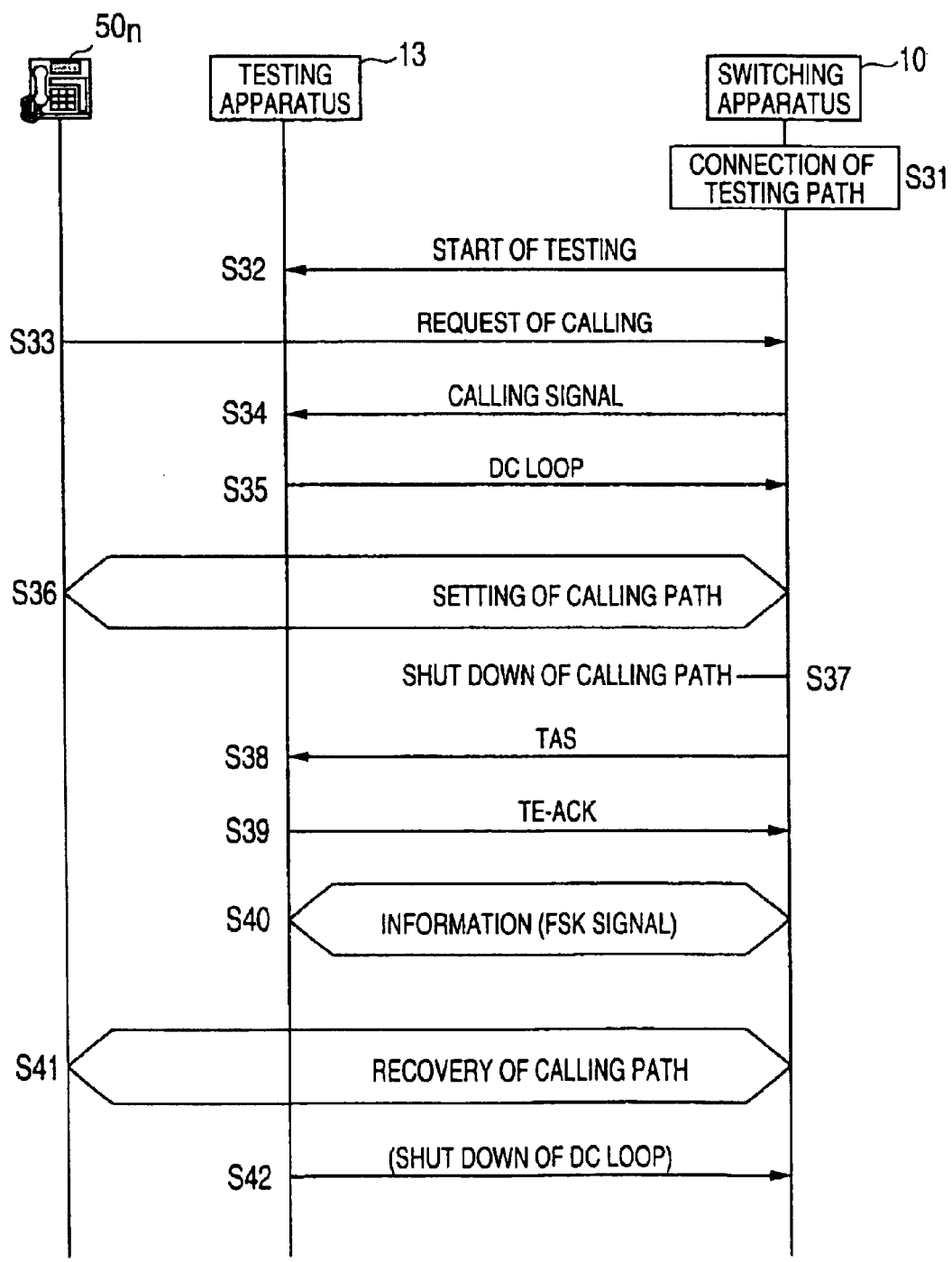
FIG. 11 shows a test sequence of the information notification service for an ETSI specification.

FIG. 11 shows a test sequence of the information notification service for the ETSI specification. This is a case where the testing apparatus 13 as shown in FIG. 2 emulates the information reception terminal for the ETSI specification which is off-hook transmission.

FIG. 12 shows the ETSI specification of the information notification service.

FIG. 12(A) shows the ETSI specification for the off-hook transmission. FIG. 12(B) shows an information data format using FSK signal and FIG. 12(C) shows an output format of the information data after the message type as shown in FIG. 12(B).

In a step S31 as shown in FIG. 11, the switching apparatus 10 connects a testing path as shown in FIG. 2. First, the test access relay 12a in the subscriber line circuit 121 is activated. As a result, the call line 20 is connected to the test line 221, so that the call line 20 is connected to the testing apparatus 13. On the other hand, the testing apparatus 13 determines to perform the test for the ETSI off-hook specification based on the station data and the instruction supplied from the switching apparatus 10. Then, the controller 28 selects the termination impedance (AC) of the two-wire/four-wire conversion circuit 27 to meet the ETSI specification. Next, the test line 22 is set to the on-hook state in which the DC loop is shut down.

In a step S32, the switching apparatus 10 sends a start of testing signal to the testing apparatus 13 through the signal line 19. In a step S33, a telephone for maintenance use 51n sends a ringing signal to a subscriber telephone 501 to create a calling path to the subscriber circuit $12_1$. However, this ringing signal will be received by the testing apparatus 13. In a step S34, the switching apparatus 10 sends a ringing signal to the testing apparatus 13. The ringing signal detection circuit 32 of the testing apparatus 13 detects the ringing signal and notifies it to the controller 28. In a step 35, the controller 28 instruct the on-hook/off-hook circuit 30 to be in the on-hook state and creates the DC loop. In a step S36, the switching apparatus 10 connects the telephone for maintenance use 51n with the subscriber telephone $50^1$. As a result, the state between the telephone for maintenance use 51n and the subscriber telephone $50_1$ is in a calling state.

Then, the switching apparatus 10 starts testing of the off-hook transmission according to the sequence described in FIG. 12(A). In a step S37, the switching apparatus 10 disconnects the voice path. In a step S38, the subscriber circuit $12_1$ is connected to the CLI 14 and the CLI 14 sends a voice band signal TAS (DT-AS). The TAS signal of the
Frequency: 2130 Hz and 2750 Hz+/−0.5%;
Output level: −15 dBm/tone+/−2 dBm, (power difference between two frequencies is within 2 dB);
Duration interval: 80 ms+/−5 ms.

In the testing apparatus 13, the digital signal reception and analysis part 25b analyzes the DT-AS signal. In a step S39, the testing apparatus 13 sends a signal D (941 Hz+1633 Hz) using DTMF (Dual Tone Multi-frequency) signal as a response signal TE-ACK on reception of the TAS (DT-AS) signal. This signal is generated by the digital signal generation and transmission part 25a. Then the signal is converted into an analog signal and sends to the switching apparatus 10. In a step S40, the information signal is sent from the switching apparatus 10 using the FSK signal. The FSK signal of the Bellcore specification is as follows.
Transmission rate: 1200 baud;
Logical one (mark) 1300 Hz;
Logical zero (space): 2100 Hz;
Output level: −13.5 dBm+/−1.5 dBm.

In the testing apparatus 13, the FSK signal is converted into the PCM data. Then, the digital signal reception and analysis part 25b analyzes the characteristics, such as a signal level, a transmission rate and a frequency of the received signal and a contents of the received signal. Then, the estimation for the test items are performed. After the reception operation is completed, the digital signal reception and analysis part 25b determines whether the off-hook transmission function is proper, then notifies the result to the controller 28.

In a step S41, the switching apparatus 10 recovers the voice path, so that the calling state is recovered. As described above, it is determined whether the information notification service function is proper or not and the test is completed. In a step S42, the testing apparatus 13 (or telephone for maintenance use 50n) can finish testing such that the testing apparatus 13 changes its state to the off-hook state. The switching apparatus 10 disconnects the testing apparatus 13. When the testing apparatus changes its state to the off-hook state in the step S36 and S41, the switching apparatus 10 and the test apparatus 13 are in a calling state. Therefore, it is also possible to finish testing after a function of voice data transmission and reception are confirmed as described in the embodiment for the NTT specification.

Figure 13:
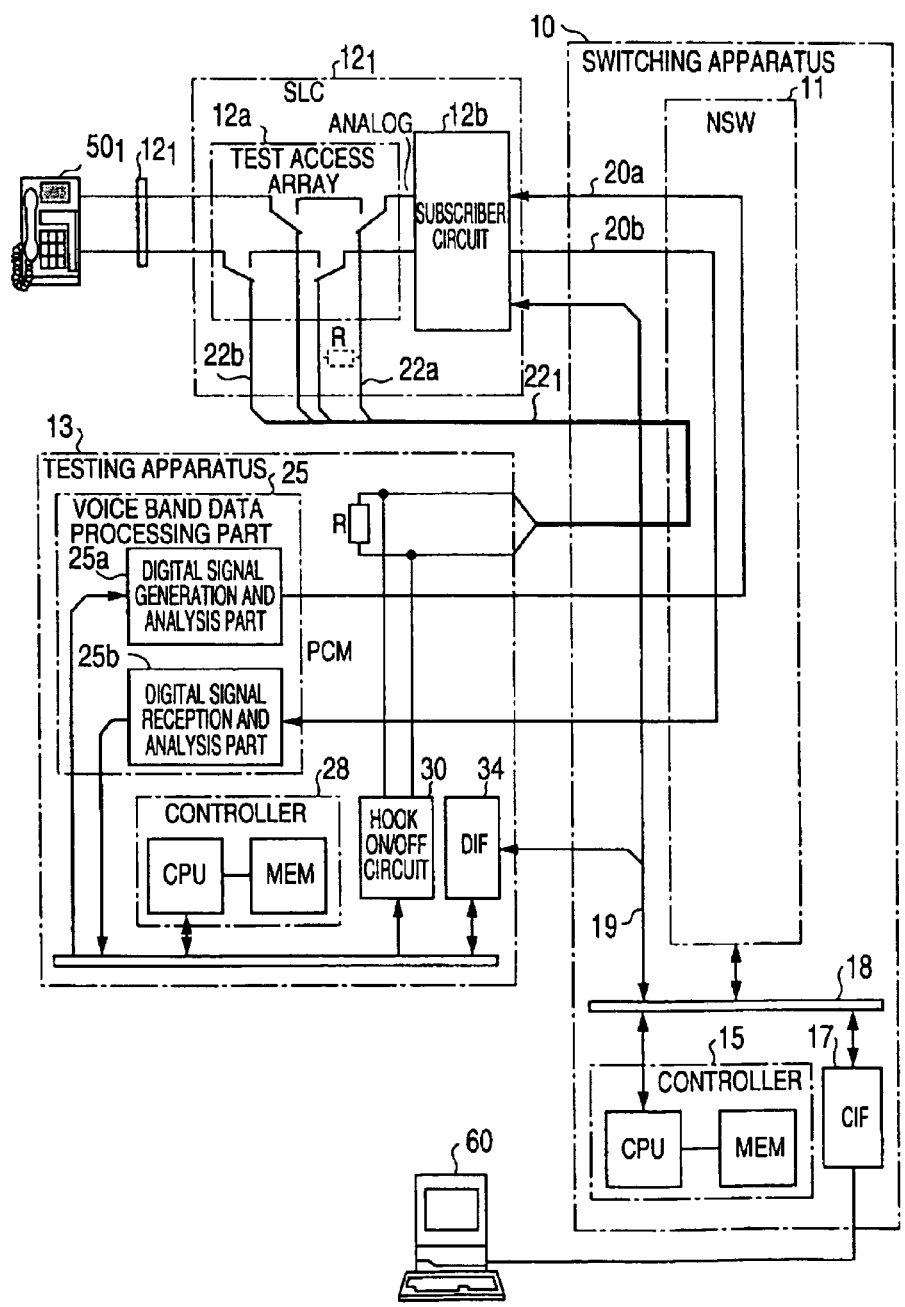
FIG. 13 shows an information notification service test method of a second embodiment according to the present invention.

Next, a second embodiment of the present invention will be explained. FIG. 13 shows an information notification service test method of the second embodiment according to the present invention, in which simple construction of the testing apparatus 13 is employed, to efficiently test the on-hook transmission function (for example, mainly the information data transmission function) of the subscriber circuit 12.

In FIG. 13, the components having the same reference numerals as shown in FIG. 2 are the same components as shown in FIG. 2. A reference numeral 12 shows the subscriber line circuit, a reference numeral 12a shows the test access relay and a reference numeral 12b shows the subscriber circuit. The testing apparatus 13 as shown in FIG. 13 is a testing apparatus of the second embodiment of the present invention. The testing apparatus 13 as shown in FIG. 13 has the voice band data processing part 25, the digital signal generation and transmission part 25a, the digital signal reception and analysis part 25b, the controller 28, the on-hook/off-hook circuit 30, the digital interface (DIF) 34 and a resistor having a high resistance including an open state.

This testing apparatus 13 is mainly intended to test an information data transmission function. Other components for testing a transmission protocol are omitted. Therefore, a cost of the testing apparatus can be reduced. The controller 28 and the voice band data processing part 25 can be constructed by the programmable device, such as the CPU, the DSP and the FPGA as shown in the first embodiment, to adapt the plurality of the specifications by means of selecting a control software or downloading the control software.

The CLI 14 is not shown in FIG. 13 because it is not used for testing the information data transmission function. However, the CLI 14 is provided in the switching apparatus.

Figure 14:
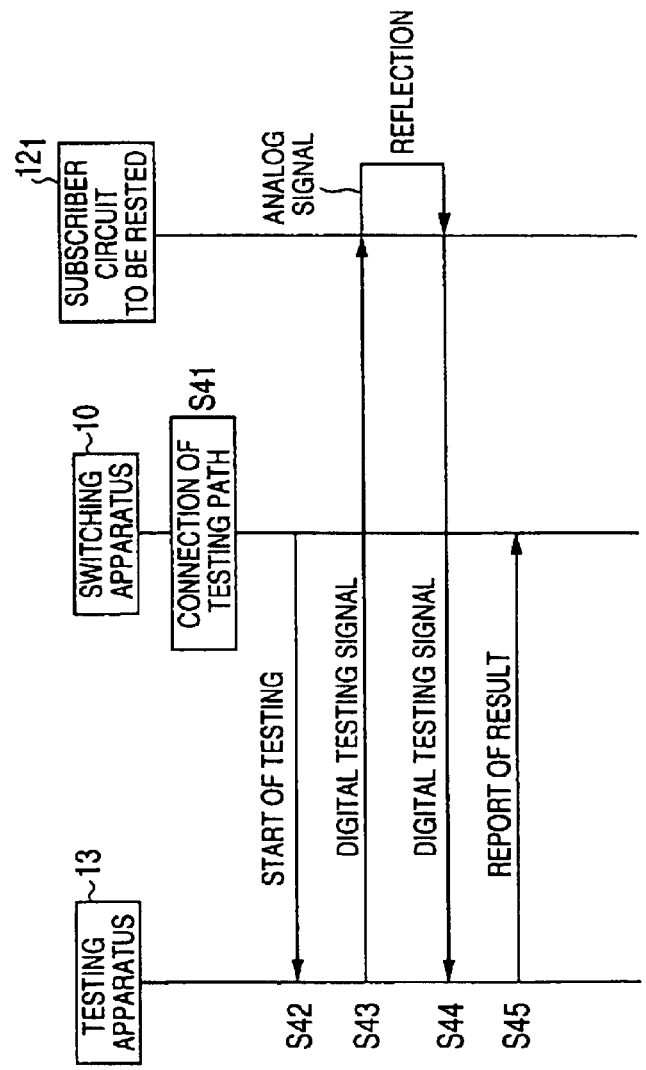
FIG. 14 shows a test sequence of the information notification service for the second embodiment according to the present Invention.

FIG. 14 shows a test sequence of the information notification service for the second embodiment according to the present invention. In a step S41, the switching apparatus 10 connects a testing path as shown in FIG. 13. First, the calling path between the subscriber circuit $12_1$ and the calling path 20a and 20b are connected. Then, a test line $22_1$ of the subscriber circuit $12_1$ is connected to the two wire line of the testing apparatus 13. The testing apparatus 13 provides a bias signal to the test line $22_1$ so as to set the on-hook state.

Next, the switching apparatus 10 activates the test access relay 12a. As a result, the two-wire line of the subscriber circuit 12b is provided with a bias signal so that it becomes the off-hook state. Then, the two-wire line 22a is connected to the termination resistor R in the testing apparatus through the test line $22_1$. On the other hand, the two-wire line of the subscriber line $21_1$ is provided with the normal bias signal if it is necessary. It is also possible to place the termination resistor R in the subscriber line circuit $12_1$. When the termination resistor R is provided in the subscriber line circuit $12_1$, it is possible to omit the connection control and the components in the network switch 11 associated with the connection control.

In a step S42, the switching apparatus 10 sends a start of testing signal to the testing apparatus 13 through the signal line 19. In a step S43, the digital signal generation and transmission part 25a of the testing apparatus 13 sends a predetermined digital test signal (for example, the PCM data using the FSK signal) to the switching apparatus 10. This digital test signal is received by the subscriber circuit 12b of the subscriber line circuit $12_1$ through the calling path 20a and converted into the analog signal (FSK signal). Then, the analog signal is supplied to the two-wire line 22a. The analog signal is completely reflected by the termination resistor R, then returns to the subscriber circuit 12b. The reflected analog signal (FSK signal) is converted to the digital test signal (PCM data) by the subscriber circuit 12b. Then, the converted digital test signal is sent to the digital signal reception and analysis part 25b in the testing apparatus 13 through the calling path 20b.

In a step S44, the digital signal reception and analysis part 25b receives and analyzes the PCM data and make a decision on the test items. The items to be decided are, for example, whether the received data is identical to the transmitted data, and whether a signal level of the received data is within a predetermined level, and so on. Then, the digital signal reception and analysis part 25b notifies it to the controller 28. In a step S45, the controller notifies the result of the decision to the switching apparatus through the signal line 19. The testing apparatus 13 can use the DTMF signal as the digital test signal in place of the FSK signal. It is preferable to use the digital signal complying with a standard, for example a signal format, which is employed in the switching apparatus.

Figure 15:
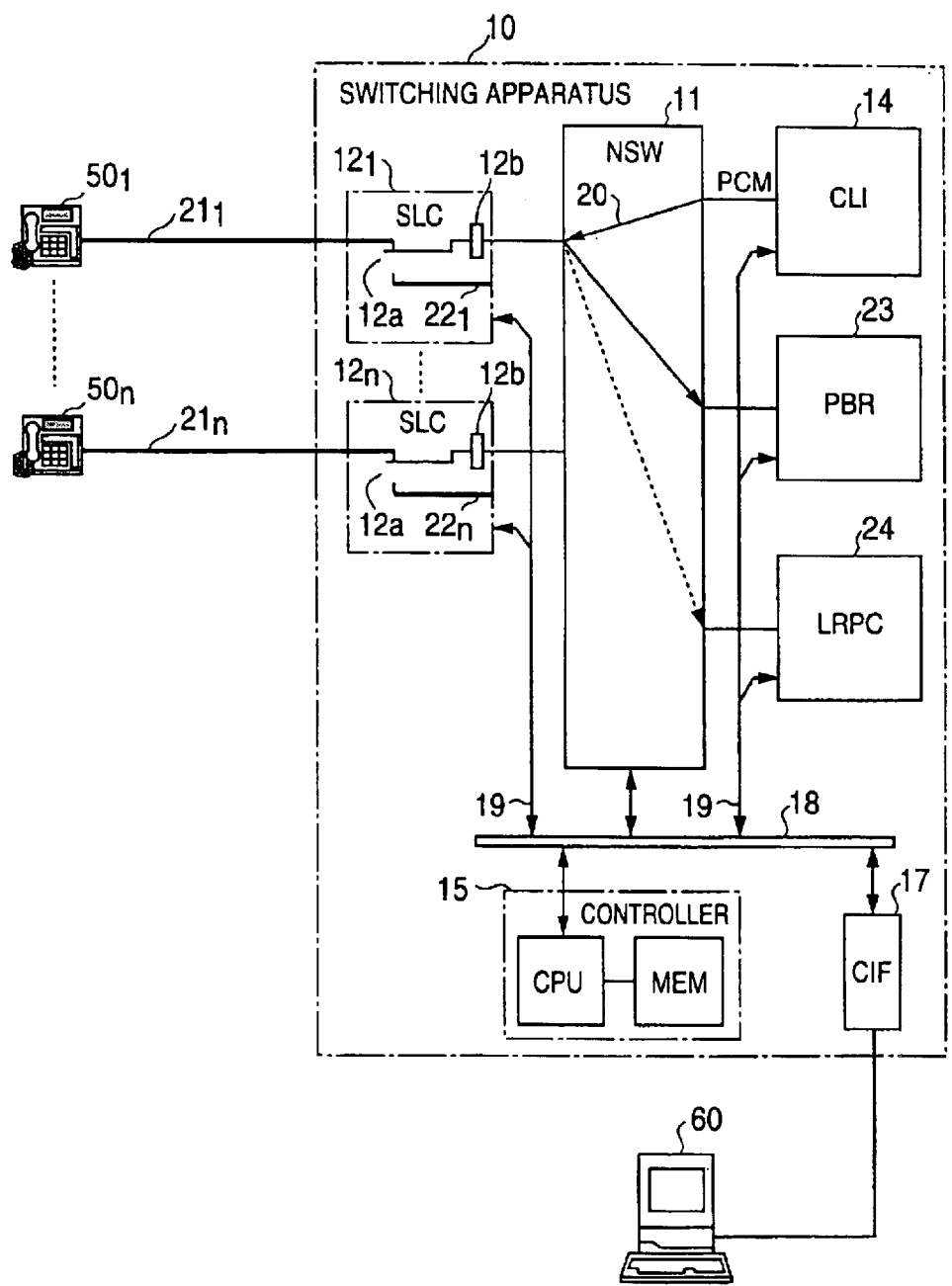
FIG. 15 shows an information notification service test method of a third embodiment according to the present invention.

Next, a third embodiment of the present invention will be explained. FIG. 15 shows an information notification service test method of the third embodiment according to the present invention, which can test the information notification service function without a dedicated testing apparatus 13 as mentioned above. This embodiment uses a subscriber reception terminal (telephone) to test the information notification service function.

The switching apparatus 10 as shown in FIG. 15 has a PBR trunk 23 which identifies a dial number using a PB signal from a subscriber and notifies it to the controller 15, and an LRPC (Line/Resister Signal and Path Controller) trunk which identifies a dial number using a dial pulse signal from a subscriber and notifies it to the controller 15. These trunks are usually provided in the switching apparatus 10.

On the other hand, the controller 15 decides whether the dial number is a special number which shows the information notification service when a call from the subscriber information terminal $50_1$ is received. If the received number is equal to the special number which shows the information notification service, then the controller 15 obtains the telephone number of the subscriber terminal $50_1$ based on the information of the subscriber line number. Then, the controller connects the CLI 14 to the subscriber terminal $50_1$ after the subscriber terminal $50_1$ is hooked on and notifies the obtained own telephone number to the subscriber terminal $50_1$.

The method for notification mentioned above complies with the specification employed in a station. Therefore, if the station employs the off-hook transmission, the telephone number is notified with off-hook state.

According to the third embodiment of the present invention, it is possible to easily test the information notification service function using the switching apparatus 10 and the information reception terminal 50. In case that an operator for maintenance is at a subscriber site, it is possible to test information notification service function at the subscriber site. Furthermore, the subscriber can also test the information notification service function using own terminal 50.

Furthermore, it is convenient to know the own telephone number from the subscriber telephone 50 from the view point of the maintenance. Generally, for example, the subscriber line is connected to the station side using a jumper wire in an MDF (main distribution frame). This jumper wire connection is performed manually. Therefore, it takes long time to connect many subscriber lines and miss connection might be caused. However, it is possible to confirm that the subscriber lines are connected correctly using the test method according to the present invention. As mentioned above, as the information terminal 50 is only used for the test, the operation for the test is simple. Furthermore, if the a cable which has many subscriber lines is cut off by accident, it is possible to re-connect the cable and to confirm the connection of the subscriber lines using the test method according to the present invention.

Figure 16:
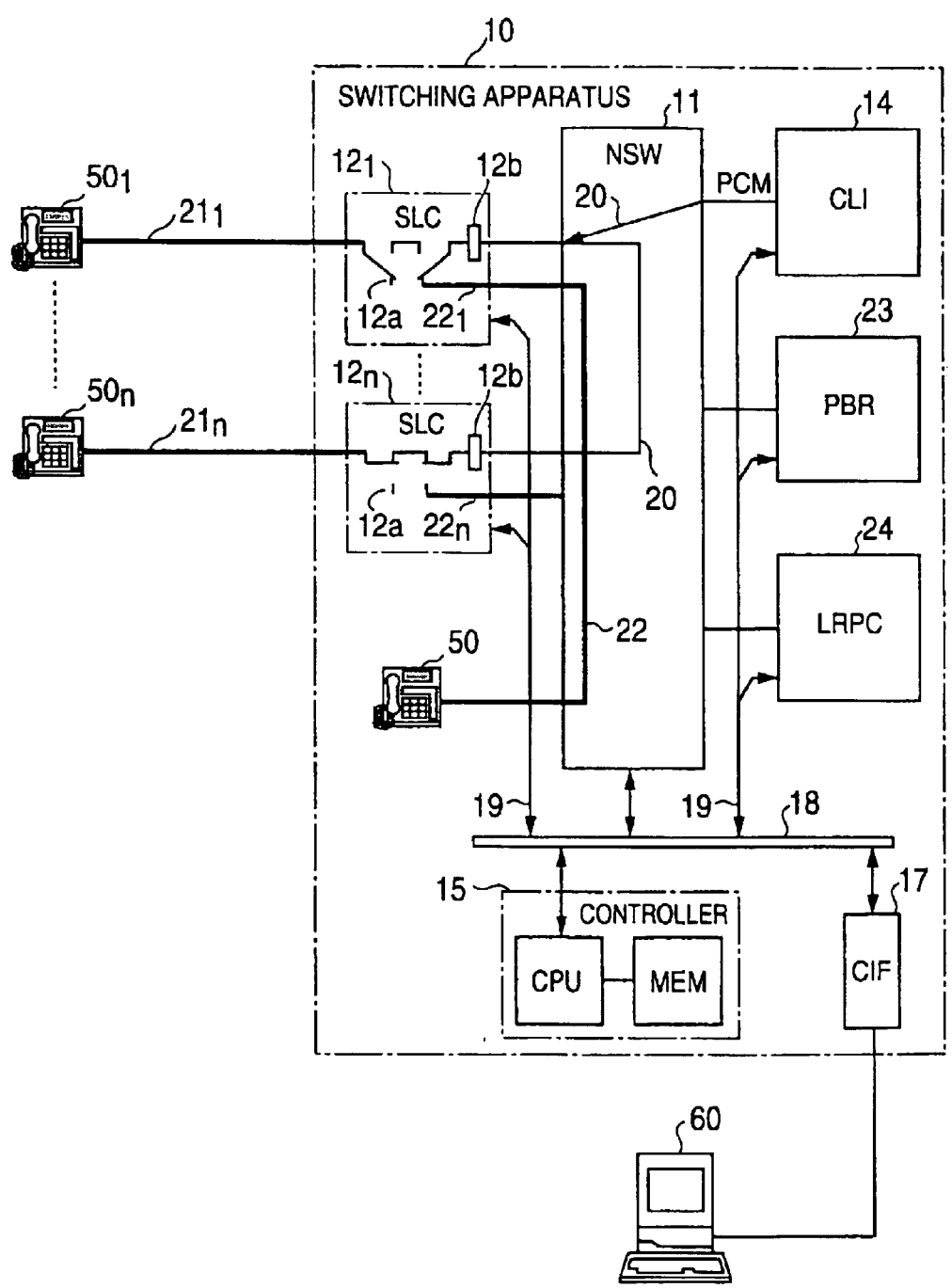
FIG. 16 shows an information notification service test method of a fourth embodiment according to the present invention.

Next, a fourth embodiment of the present invention will be explained. FIG. 16 shows an information notification service test method of the fourth embodiment according to the present invention which is intended to test a function of a station side, such as the subscriber circuit, using a commonly used information reception terminal 50.

In FIG. 16, the information reception terminal 50 is provided in the switching apparatus in place of the testing apparatus 13. The switching apparatus 10 can directly connects the test line 22, of the subscriber line circuit 12, to the information reception terminal 50 according to an instruction issued by the console 60.

When the telephone $50n$ for maintenance use calls the telephone $50_1$, the telephone number is displayed on the telephone 50 through the test line 22 by the information notification service. Then, it is possible to call between the telephone $50n$ and the telephone 50 after the telephone 50 is hooked on. After the test is finished, the connection is recovered according to the instruction issued by the console 60.

Therefore, it is possible to test the subscriber line circuits $12_1$ to $12n$ on the information notification services as described above. When it is failed to display the information on one subscriber terminal, it is also possible to find whether there is a problem on the subscriber terminal side or on the station side.

Furthermore, the switching apparatus 10 may have the own telephone number notification function as described in the third embodiment of the present invention. Then, it is possible to perform the test for the own telephone number notification function and the test of the subscriber circuit 12, for the station side, separately. Therefore, it is easily to find where the fault is occurred, in the subscriber side or in the station side.

Next, an embodiment of a demodulation method of the FSK signal for the NTT specification, the Bellcore specification and the ETSI specification will be explained.

A demodulation method of the FSK signal is described in Japanese Laid-open Patent Application number 9-233135 entitled "A FSK demodulator and a FSK demodulation method" and Japanese Laid-open Patent Application number 9-233137 entitled "An FSK demodulator and an FSK demodulation method". In the prior art, the FSK demodulator has a zero crossing point interval calculation means in which the FSK signal is first sampled and then the zero crossing point interval is calculated based on the sampled FSK signal. Then, a frequency of the FSK signal is decided based on the zero crossing point interval. As a result, a mark or a space contained in the FSK signal is detected using a low sampling frequency without causing a distortion of the FSK signal.

In the data transmission using the FSK signal, a data bit of "0" and "1" corresponds to the mark and the space in the FSK signal. When a transition between the mark and the space is occurred at the zero crossing point of the FSK signal, the zero crossing point interval is equal to one cycle period of the FSK signal corresponding to either the mark or the space. However, when a transition between the mark and the space is occurred at a point between the zero crossing point of the FSK signal, the zero crossing point interval has a value between the one cycle period of the FSK signal corresponding to the mark and that of the space.

An example described in the prior art, in which a center frequency is equal to 1500 Hz, a mark frequency is equal to 1530 Hz and a space frequency is equal to 1470 Hz, will be explained.

FIG. 17 shows the FSK signal which is described in the prior art. FIG. 17(A) shows the mark signal having the frequency of 1530 Hz and its zero crossing interval is equal to 326.8 $\mu$sec. FIG. 17(B) shows the space signal having the frequency of 1470 Hz and its zero crossing interval is equal to 340.14 $\mu$sec. FIG. 17(C) shows a case where the transition from the mark to the space is occurred at a point of one fourth period of the FSK signal for the mark. In this case, the interval between the last zero crossing point of the FSK signal for the mark and the first zero crossing point of the FSK signal for the space is 333.47 $\mu$s. The interval having the transition described above is decide to be the space based on the period of 333.33 $\mu$s of the center frequency of 1500 Hz. However, the interval has the transition from the mark to the space as mentioned above.

It is needed to detect a bit transition point between the mark and the space and a bit position when each of the data bit in the FSK signal is decided to be "1" or "0". However, the bit transition point and the bit position is not considered when each of the data bit in the FSK signal is decided to be "1" or "0" in the prior art.

This embodiment provides the simple and accurate FSK signal detection method in which the bit transition point and the bit position are detected by means of measuring the zero crossing point interval.

Figure 18:
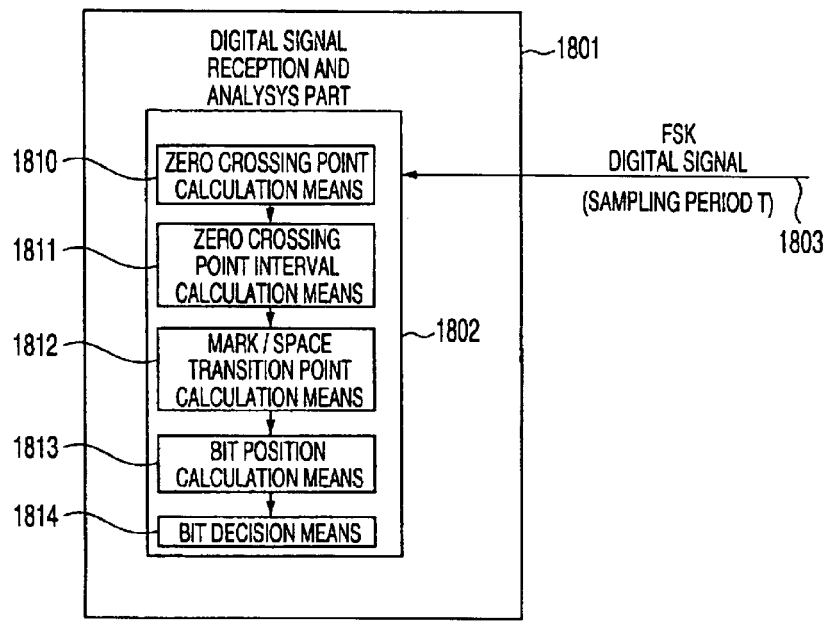
FIG. 18 shows an embodiment of an FSK demodulator of the present invention.
Figure 19:
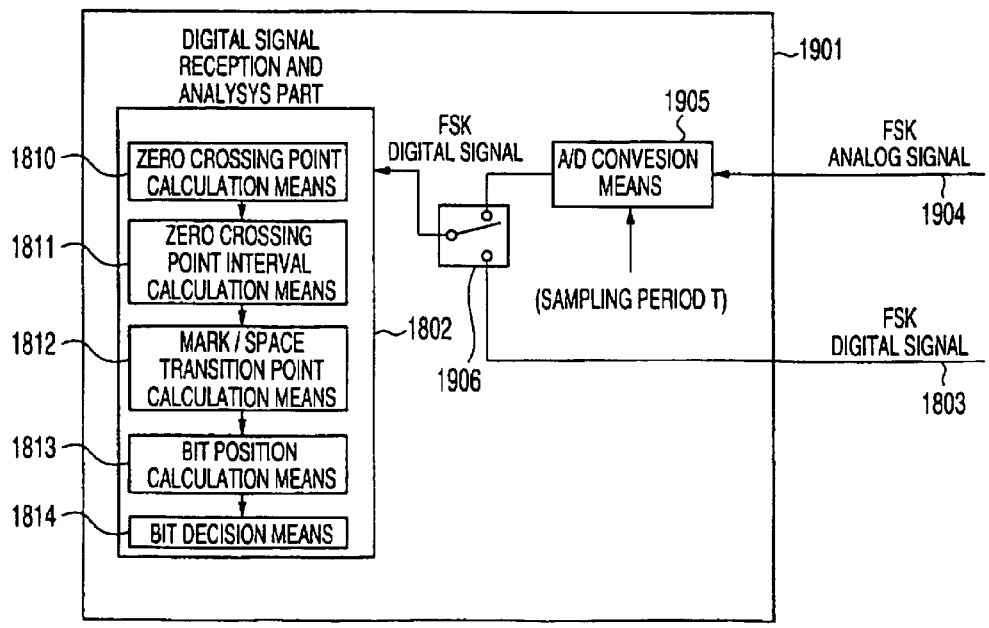
FIG. 19 shows another embodiment of an FSK demodulator of the present invention.

FIG. 18 shows an embodiment of an FSK demodulator 1801 and FIG. 19 shows another embodiment of an FSK demodulator 1901 of the present invention. The demodulator 1801 is used to demodulate a digital FSK signal. On the other hand, the demodulator 1901 is used to demodulate both the digital FSK signal and an analog FSK signal. The demodulator 1801 has a digital signal reception and analysis part 1802. The digital signal reception and analysis part 1802 has a zero crossing point calculation means 1810, a has a zero crossing point interval calculation means 1811, a mark/space transition point calculation means 1812, a bit point calculation means 1813 and a bit decision means 1814.

FIG. 19 has the digital signal reception and analysis part 1802 and an A/D conversion means 1905 which converts an analog FSK signal to a digital FSK signal and a switch 1906. The digital signal reception and analys is part 1802 is the same as that in the FSK demodulator as shown in FIG. 18. When the analog FSK signal is supplied to the FSK modulator 1901, the analog FSK signal is converted to the digit al FSK signal by the A/D conversion means 1905 and the digital FSK signal is supplied the digital signal reception and analysis part 1802 through the switch 1906. On the other hand, when the digital FSK signal is supplied to the FSK modulator 1901, the digital FSK signal is supplied to the digital signal reception and analysis part 1802 through the switch 1906.

Next, an operation of the FSK demodulator 1901 to demodulate the FSK signal having the NTT specification will be explained. In the description hereinafter, parameters are as follows:

Transmission Speed: 1200 baud (bps),
Center frequency: 1700 Hz,
Mark frequency 1300 Hz,
Space frequency: 2100 Hz,
Sampling period 125 $\mu$s.
The sampled digital signal is DC free,
The digital signal supplied to the digital signal reception and analysis part 1802 is 8-bit $\mu$-255 PCM data. It is assumed that a magnitude of the digital signal is expressed by an integer value decoded from the 8-bit $\mu$-255 PCM data, in the description hereinafter. The value of the integer is less than or equal to 8159. The decoding is first performed in the digital signal reception and analysis part 1802.

The digital signal reception and analysis part 1802 processes the digital FSK signal as follow.

Step (1): Zero crossing point calculation

Figure 20:
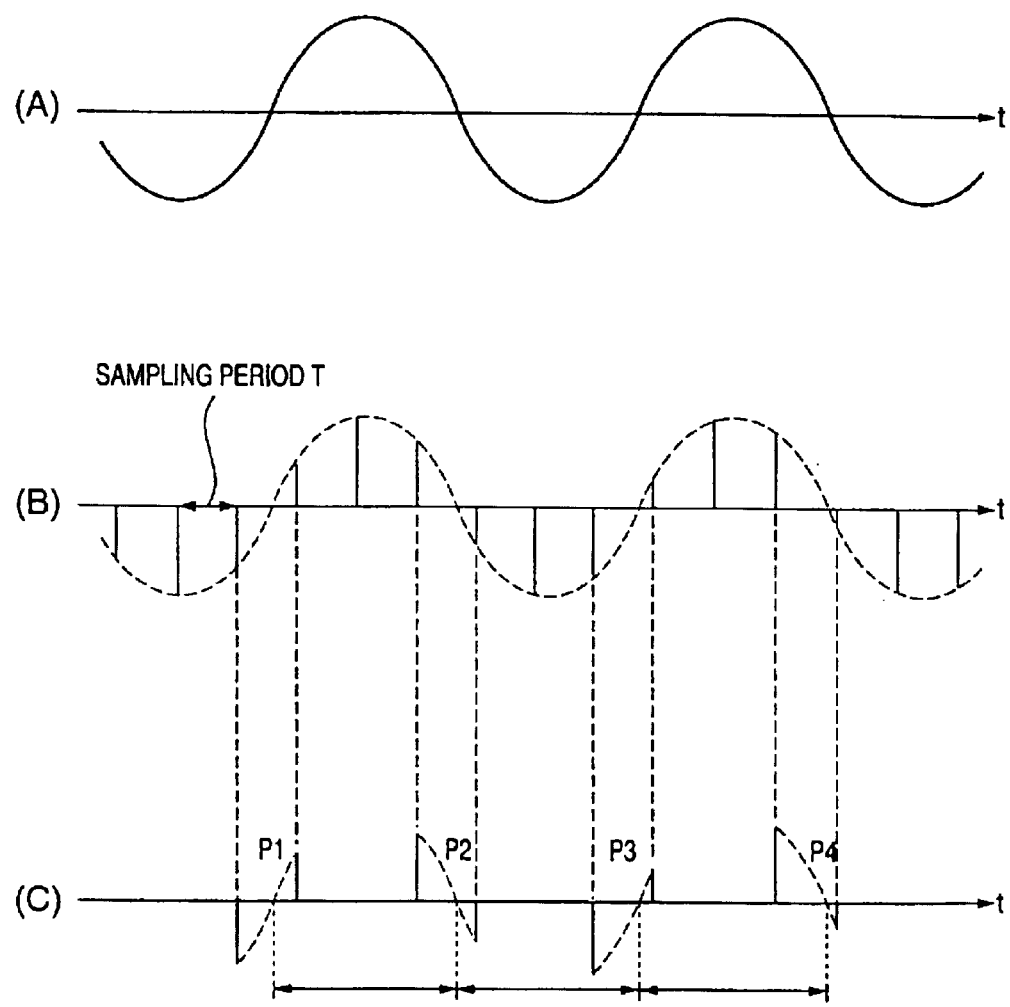
FIG. 20 shows the operation of the zero crossing point calculation means.
Figure 21:
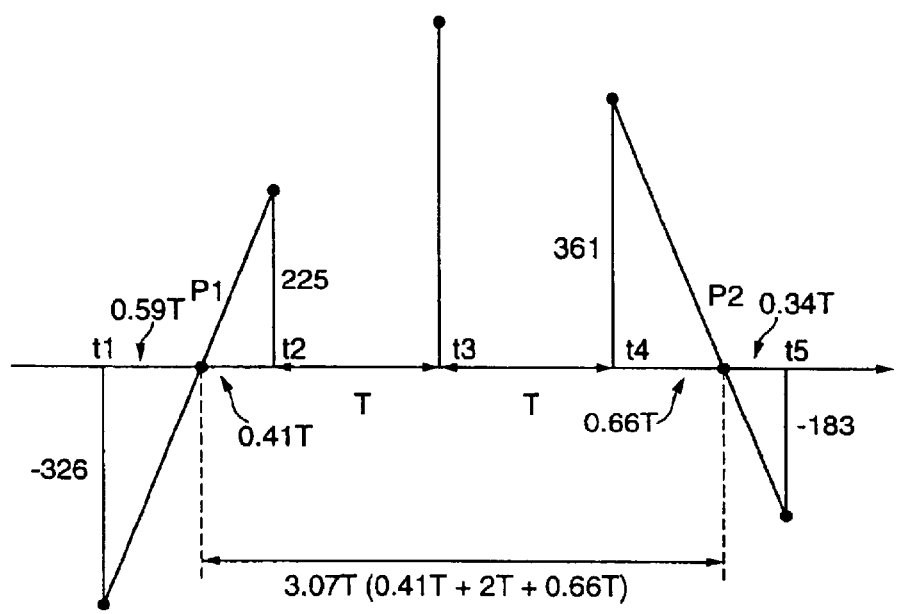
FIG. 21 shows the operation of the zero crossing point calculation means.

FIG. 20 and FIG. 21 show the operation of the zero crossing point calculation means 1810. The zero crossing point calculation means 1810 calculates a time of the zero crossing point in the input digital FSK signal. FIG. 20(A) shows the input analog FSK signal. FIG. 20(B) shows the digital FSK signal which is a sampled signal of the analog FSK signal sampled by the A/D conversion means 1905 as shown in FIG. 19 with the sampling period T. As shown in FIG. 20(B), the zero crossing point exists between two successive samples of the digital FSK signal when each of the two successive samples has an opposite polarity with each other. FIG. 20(C) shows where each of the two successive samples has an opposite polarity with each other. Points P1, P2, P3 and P4 are the zero crossing points. Each of the zero crossing points are calculated using a linear approximation. In the linear approximation, each of the two successive samples having the opposite polarity with each other is connected with a straight line, and the zero crossing point is calculated as a point at which the straight line crosses the zero level. FIG. 21 shows a case where the zero crossing points P1 and P2 are calculated. The sampled value at times t1, t2, t4 and t5 are 326, 225, 361 and −183, respectively. The calculated time of the point P1 is 0.59 T from the point t1 and the calculated time of the point P2 is 0.66 T from the point t4, where T shows the sampling period. Generally, when a sample has the value m at the point tm and a successive sample has the value n at the point tn, the zero crossing point is calculated from an equation of $|m|\times T/|m-n|$. If the digital signal is equal to zero, the time at which the digital signal is sampled is the zero crossing point.

Step (2): Zero crossing point interval calculation

Next, an operation of the zero crossing point interval calculation means 1811 will be explained. The zero crossing point interval calculation means 1811 calculates the interval between the successive zero crossing points. In FIG. 21, the interval between the point P1 and the point P2 is corresponds to the zero crossing point interval between the successive zero crossing points. In this case, the zero crossing point interval is 3.07 T. The zero crossing point interval is the interval between the successive zero crossing point of the FSK signal, and basically corresponds to a half period of the FSK signal.

Step (3): Mark/space transition point calculation

Figure 22:
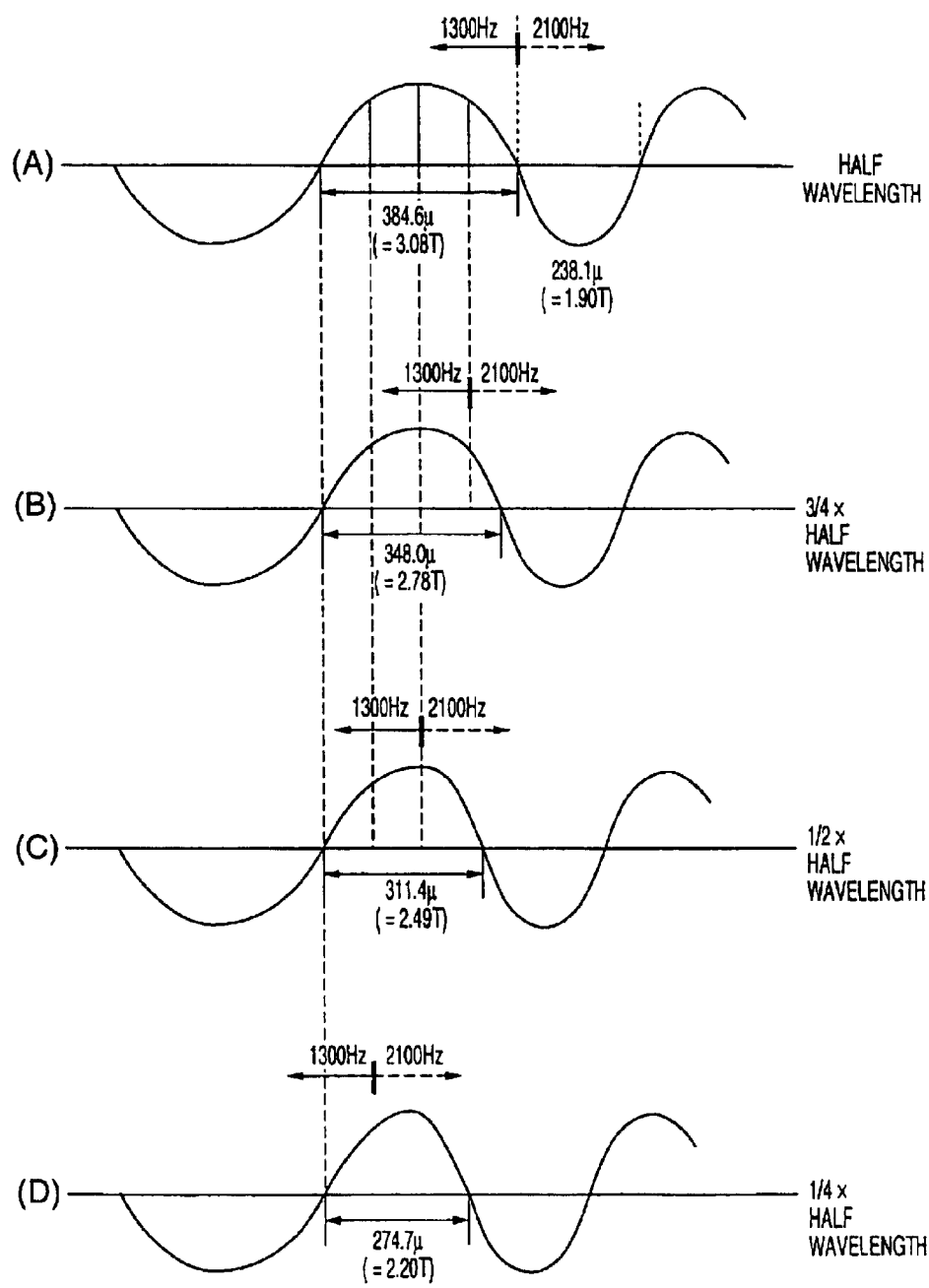
FIG. 22 shows an operation of the mark/space transition point calculation means.

FIG. 22 shows an operation of the mark/space transition point calculation means 1812. The mark/space transition point calculation means 1812 calculates a transition point between the mark and the space by means of measuring the zero crossing point interval.

The data format, the control signals and the output format of the NTT specification are described in FIG. 5, FIG. 7 and FIG. 7. As shown in FIG. 7(A), a preceding data of the first start bit is the mark bit. The start bit is placed in front of the 8-bit data and the stop bit is placed after the 8-bit data. As the stop bit is the mark (logical "1"), the preceding bit just before the start bit for any 8-bit data is the mark (logical "1"). As the start bit is the space (logical "0"), it is needed to detect a point at which the transition from the mark to the space is occurred to detect the position of the start bit.

In case of the NTT specification, the mark (logical "1") corresponds to the frequency of 1300 Hz and the space (logical "0") corresponds to the frequency of 2100 Hz. Therefore, the zero crossing point interval corresponding to the mark is 3.08 T (384.6 $\mu$s) and the zero crossing point interval corresponding to the space is 1.09 T (238.1 $\mu$s). Then, the zero crossing point interval between 2.77 T and 3.38 T is decided to be the mark and the zero crossing point interval between 1.71 T and 2.10 T is decided to be the space. In this values, a margin of 10% is included for the detection.

FIG. 22 shows variations of the zero crossing point intervals according to variations of the transition points from the mark to the space. FIG. 22(A) shows a case where the transition from the mark to the space is occurred at the time of a half period of the mark frequency (1300 Hz). FIG. 22(B) shows a case where the transition from the mark to the space is occurred at the time of three eighth period of the mark frequency (1300 Hz). FIG. 22(C) shows a case where the transition from the mark to the space is occurred at the time of a quarter period of the mark frequency (1300 Hz). FIG. 22(D) shows a case where the transition from the mark to the space is occurred at the time of one eighth period of the mark frequency (1300 Hz). FIG. 22(A) also shows a case where the transition from the mark to the space is occurred at the zero crossing point. As shown in FIG. 22, the zero crossing point intervals are 3.08 T, 2.78 T. 2.49 T and 2.20 T, respectively. The zero crossing point interval has a value between the half period of the mark frequency and that of the space frequency according to the transition point from the mark to the space.

The transition point from the mark to the space can be calculated using the zero crossing point interval. When the transition point exists between the successive zero crossing points, an interval w between the preceding zero crossing point and the transition point is as follows;

$$w=(2.625 \times r)-5,$$

where r and w are measured in the sampling period T =125 μs.

Therefore, it is possible to accurately detect when the transition from the mark to the space is occurred by measuring the zero crossing point interval r. An calculation procedure of the mark/space transition point is as follows.

(a) When a signal level of the FSK signal is more than a predetermined level, the zero crossing point calculation (1) and the zero crossing point interval calculation (2) are performed. When the signal level of the FSK signal is less than a predetermined level the zero crossing point calculation (1) and the zero crossing point interval calculation (2) are not performed.

(b) The procedure (a) is repeated until the mark is detected based on the zero crossing point interval calculation. When the zero crossing point interval becomes between 2.77 T and 3.38 T, the mark is detected.

(c) After the mark is once detected, the procedure (b) is repeated until the zero crossing point interval becomes between 2.10 T and 2.77 T. When the zero crossing point interval becomes between 2.10 T and 2.77 T, it is decided that the transition exists in the zero crossing point interval. Then, the transition point is calculated based on the equation described above. When the zero crossing point interval becomes between 1.71 T and 2.10 T, it is decided that transition from the mark to the space is occurred at the zero crossing point. Therefore, it is not needed to calculate the transition point.

Figure 23:
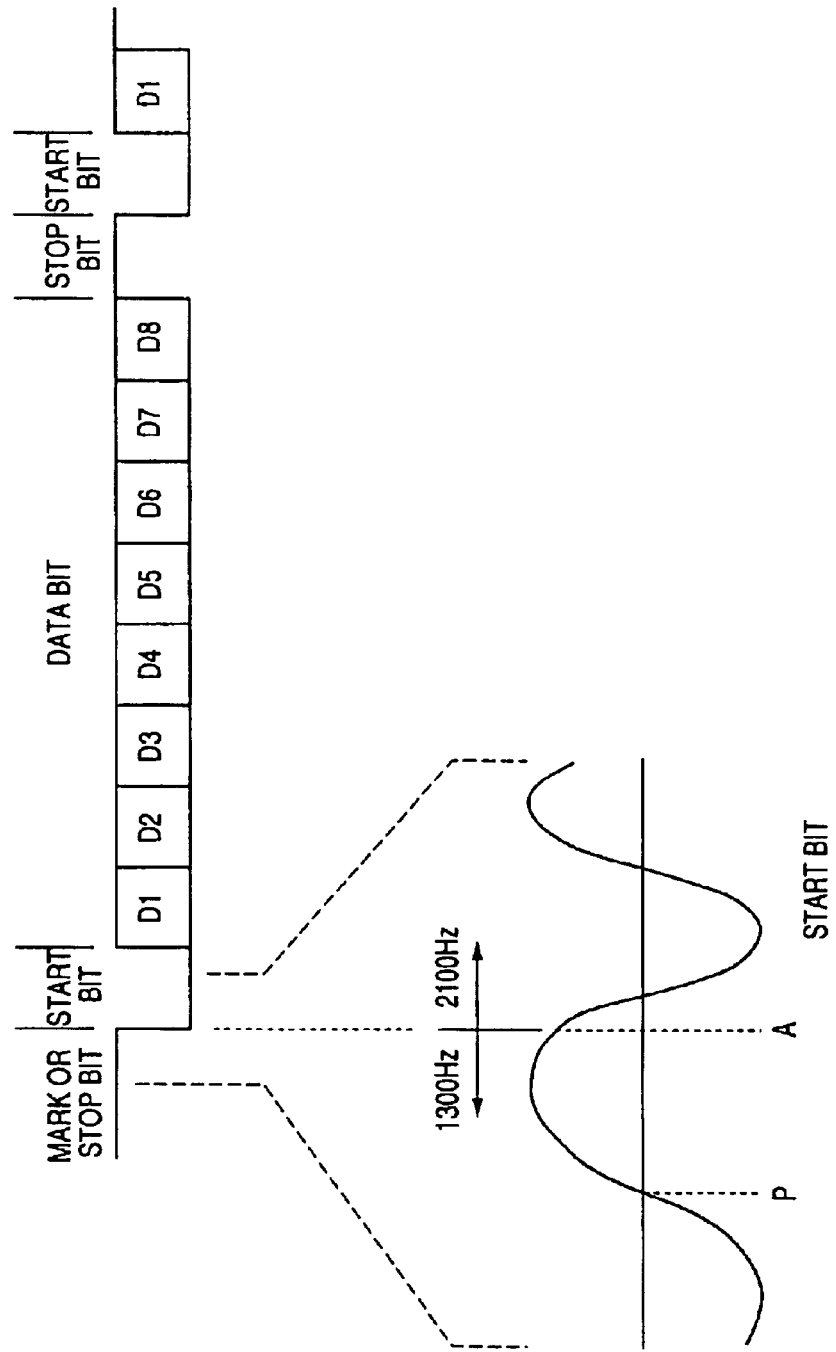
FIG. 23 shows a relation between the transition point from a mark to a space and the data bits.

As mentioned above, the transition point from the mark to the space is calculated. FIG. 23 shows a relation between the transition point from the mark to the space and the data bits, in which the FSK signal is enlarged. A point A in FIG. 23 shows the transition point from the mark to the space.

Step (4): Bit position calculation

Figure 24:
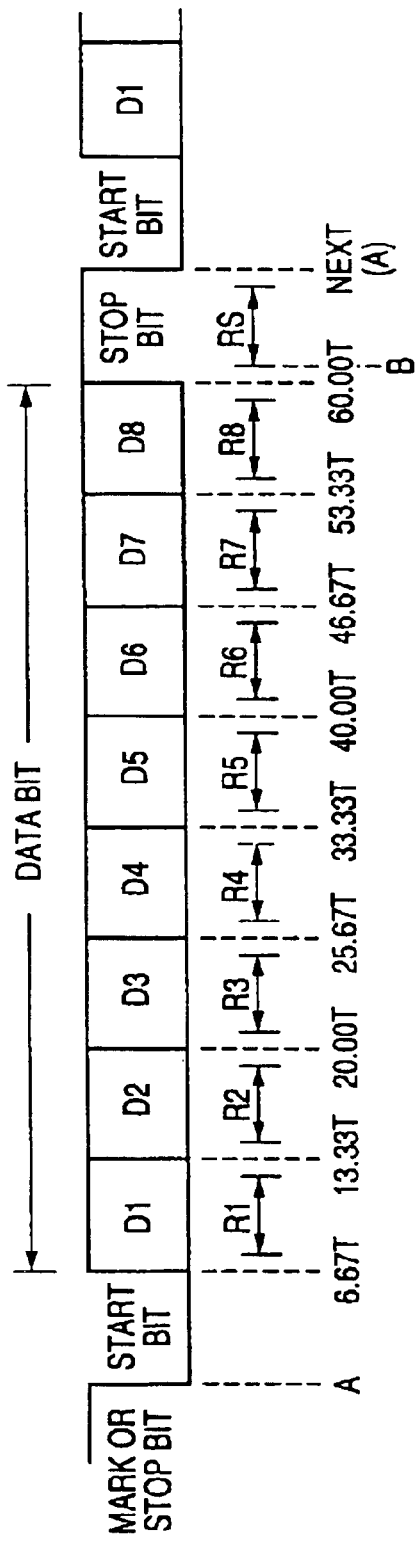
FIG. 24 shows each bit position from an point A where a start bit begins.

Next, the bit position calculation means 1813 calculates the bit position based on the transition point. The bit position calculation means 1813 can accurately decide each of the bit positions of the subsequent 8-bit data based on the transition point from the mark to the space because the transition point corresponds to the point where the start bit begins. In this embodiment, one period of the data bit is 6.67 T (833.33 μs) because the transmission rate is 1200 bps. FIG. 24 shows each bit position from the point A where the start bit begins. As shown in FIG. 24, each boundary between successive bits is accurately identified so that each bit position can also be detected accurately.

Step (5): Bit decision

The bit decision means decides each bit of the data based on the position determined by the bit position calculation means 1813. The decision whether the FSK signal shows the mark or the space is performed at the position determined by the bit position calculation means 1813. The decision whether the FSK signal shows the mark or the space is performed by the calculation of the zero crossing point interval as described above.

The position of the point A is affected by an actual transmission rate, a variation of the mark and the space frequencies because it is calculated by the zero crossing point interval. Therefore, the bit position calculated by step (4) may have an error. Therefore, it is preferable to perform the bit decision during periods R1 to R8 and Rs to avoid the erroneous bit decision performed at the boundary between successive bits. Each period from R1 to R8 and Rs provided with IT margin is as follow.

R1: 7.67 T~12.33 T

R2: 14.33 T~19.00 T

R3: 21.00 T~25.67 T

R4: 27.67 T~32.33 T

R5: 34.33 T~39.00 T

R6: 41.00 T~45.64 T

R7: 47.66 T~52.33 T

R8: 54.33 T~59.00 T

RS: 61.00 T~

FIG. 24, a point B is a start point to repeat the process from the procedure (b) in the step (3). The demodulation of the FSK signal is easily achieved by repeating the process. As a result, it is possible to provide the simple and accurate FSK signal demodulation method.

The FSK signal demodulation method for the NTT specification is described above. However, the digital signal reception and analysis part 1802 can be applied to demodulate the FSK signals for the Bellcore specification and the ETSI specification.

The transmission rates of the Bellcore specification and the ETSI specification are the same transmission rate of 1200 bps as the NTT specification. The start bit (mark) is provided in front of the first bit of the 8-bit data and the stop bit (space) is provided after the last bit of the 8-bit data. Furthermore, in the ETSI specification, the mark frequency is the same frequencies as the NTT specification and the space frequency is also the same frequency as the NTT specification. Therefore, the FSK demodulation method for the NTT specification can be applied to the FSK signal of the ETSI specification. In the Bellcore specification, the mark frequency is 1200 Hz and the space frequency is 2200 Hz. Therefore, the mark and the space frequencies of the Bellcore specification are different from those of the NTT specification. However, from the view point of the FSK demodulation, the zero crossing point intervals are only different from those in the NTT specification. Furthermore, each bit position from the transition point where the transition from the mark to the space is occurred is the same position as the NTT specification. Therefore, the FSK demodulation procedure or the FSK demodulation algorithm are the same as those for the NTT specification. As a result, it is possible to adapt the FSK demodulation method for the NTT specification to the Bellcore specification and the ETSI specification by modifying a threshold values of the zero crossing point interval to decide the bit and the equation to calculate the value w. These modification is easily achieved using programmable devices. Especially, it is possible to adapt all the specification by constructing the digital signal reception and analysts part 1802 using, for example, a DSP (digital signal processor) or an FPGA (field programmable gate array).

Figure 25:
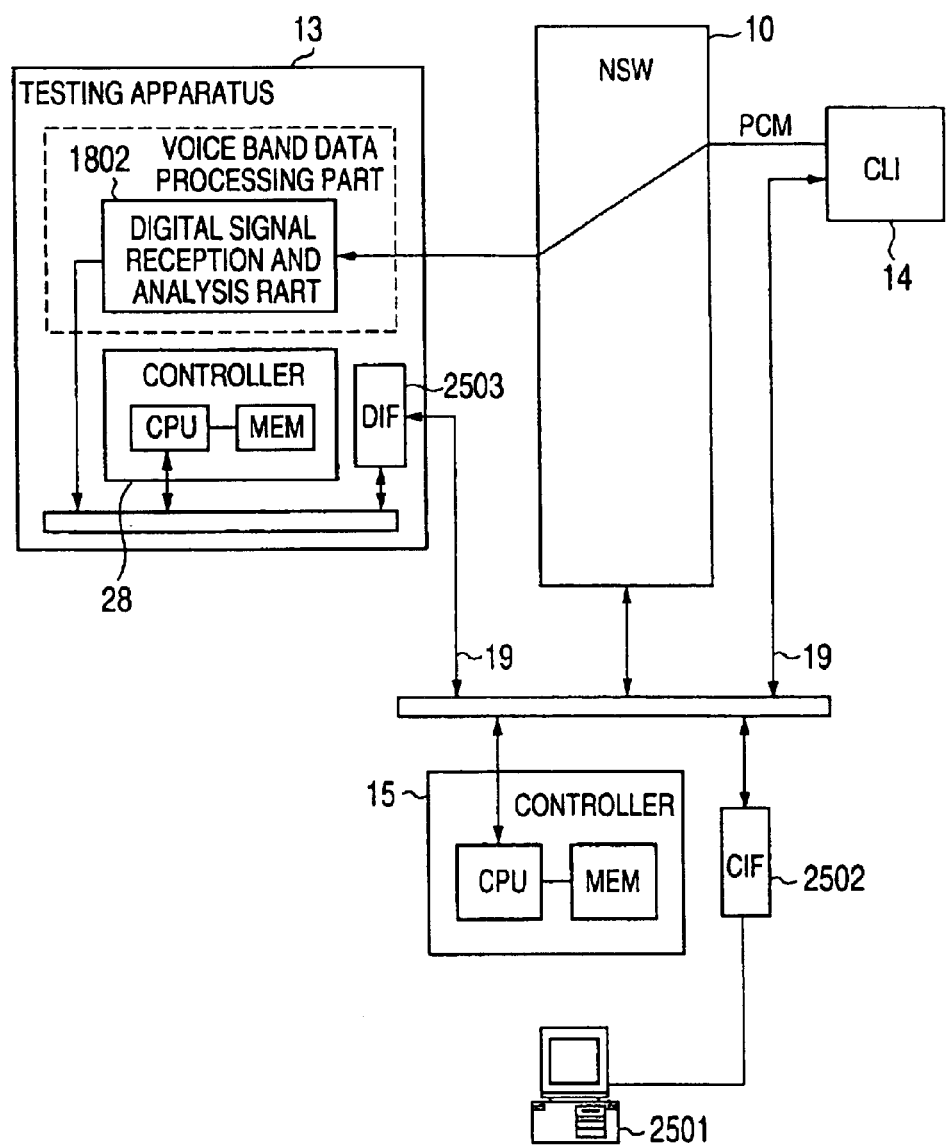
FIG. 25 shows a construction of an embodiment of the information notification service testing apparatus of the present invention.

Next, an embodiment of the present invention in which the FSK demodulation method is applied the information notification service testing apparatus. FIG. 25 shows a construction of the embodiment of the information notification service testing apparatus. The component having the same reference numeral is the same component. The digital signal reception and analysis part 1802 having the FSK signal demodulator as described above is provided in the information notification service testing apparatus 13.

First, the CLI 14 outputs the digital FSK signal (PCM signal). The digital FSK signal output from the CLI 14 is supplied to the testing apparatus 13 through the NSW 10. In the testing apparatus 13, the digital signal reception and analysis part 1802 receives and demodulates the FSK signal. Then, the data represented by the FSK signal output from the CLI 14 and the data demodulated from the FSK signal by the testing apparatus 13 are sent to a personal computer 2501 through an interface CIF 2501. Then, both data are compared in the personal computer 2501. If data demodulated from the FSK signal by the testing apparatus 13 matches the data represented by the FSK signal output from the CLI 14, then it is decided that the FSK signal transmitting function of the CLI 14 is proper.

The present invention is not limited to the specifically disclosed embodiments, and variations and modifications may be made without departing from the scope of the present invention.

The present application is based on Japanese priority application No. 11-285012 filed on Oct. 6, 1999, the entire contents of which are hereby incorporated by reference.

What is claimed is:

1. A testing method which is used to perform a test of an information notification service function of a switching apparatus which provides the information notification service in compliance with a predetermined information notification service specification, said testing method comprising a step of performing an information notification service function between a testing apparatus which emulates a plurality of types of information reception terminals for different information notification service specifications based on one of externally provided software and internal software, and the switching apparatus which connects a subscriber side two-wire in a subscriber line-circuit in said switching apparatus to said testing apparatus.

2. A testing apparatus which emulates a plurality of types of information reception terminals for different information notification service specifications based on one of externally provided software and internal software, and which is used to perform a test of an information notification service function of a switching apparatus which provides the information notification service in compliance with a predetermined information notification service specification, said testing apparatus comprising:

a hardware block which sends and receives controls signals and information data using a voice band signal, which are in compliance with different information notification service specifications, by means of connecting said hardware block to a subscriber side two-wire in a subscriber line circuit in said switching apparatus; and a control block which controls said hardware block using a software that changes a controlling operation by means of replacing said software according to the information notification service specification to be tested.

3. The testing apparatus as claimed in claim 2, wherein said hardware block is constructed by a programmable device, and said control block changes said controlling operation by means of downloading said software.

4. The testing apparatus as claimed in claim 2, wherein said control block change said controlling operation according to an information on a station data information in said switching apparatus or a test-mode instruction sent from said switching apparatus.

5. A testing method which is used to perform a test of an information notification service function of a switching apparatus which provides the information notification service in compliance with a predetermined information notification service specification, using a termination resistor with a high resistance connected to a test line in a subscriber line circuit, a testing apparatus, which emulates a plurality of types of information reception terminals for different information notification service specifications based on one of externally provided software and internal software, connected to a call line of a switching apparatus to send and receive test data using a voice band signal and said switching apparatus, said call line of which is connected to said testing apparatus, said method comprising steps of:

sending an analog signal corresponding to test data from said testing apparatus to said termination resistor through said call line of said switching apparatus;

reflecting said analog signal using said resistor;

receiving a reflected analog signal by said termination resistor by means of said testing apparatus through said call line of said switching apparatus; and analyzing received data corresponding to said reflected analog signal.

6. The testing method as claimed in claim 5, wherein said switching apparatus connects said test line to said testing apparatus, and said termination resistor is provided in said testing apparatus.

7. The testing method as claimed in claim 5, wherein said testing method further comprising a step of encoding said test data using an FSK signal or a DTMF signal.

8. A testing method which is performed in a testing apparatus that emulates a plurality of types of information reception terminals for different information notification service specifications based on one of externally provided software and internal software, and which is used to perform a test of an information notification service function of a switching apparatus which provides the information notification service in compliance with a predetermined information notification service specification, said method comprising steps of;

translating a dialed number from a subscriber by means of said switching apparatus when ringed;

capturing said dialed number when a translated number by said translating step is equal to a predetermined number; and, notifying said dialed number to said subscriber.

9. A testing method which is performed in a testing apparatus that emulates a plurality of types of information reception terminals for different information notification service specifications based on one of externally provided software and internal software, and which is used to perform a test of an information notification service function of a switching apparatus which provides the information notification service in compliance with a predetermined information notification service specification, using a switching apparatus which connects a test line from a subscriber line circuit to a reception terminal for a test, said method comprising steps of:

calling from one subscriber terminal to another subscriber terminal connected to said subscriber line circuit to be tested; and, displaying an information on said subscriber terminal that called in said calling step on said reception terminal for said test.

10. The testing method as claimed in claim 9, further comprising the steps of;

translating a dialed number from said subscriber by means of said switching apparatus when ringed;

capturing said dialed number when a translated number by said translating step is equal to a predetermined number; and, notifying said dialed number to said subscriber.

11. An FSK signal demodulation method comprising:

a zero crossing point calculation step in which said zero crossing point is calculated based on two successive samples of said FSK signal using a linear approximation;

a zero crossing point interval calculation step;

a mark/space transition point calculation step;

a bit point calculation step which decides a bit point based on a mark/space transition point calculated by said mark/space transition point calculation step; and a bit decision step which decides a bit value based on said bit point calculated by said bit point calculation step, wherein the bit value is decided during a period smaller than the full period between successive bit points so that the bit value is decided at other than a bit boundary.

12. The FSK signal demodulation method as claimed in claim 11, wherein said bit point calculation step decides said bit point value during an interval excluding predetermined interval between a predetermined point before said mark/space transition point and another predetermined point after said mark/space transition point.

13. An FSK signal demodulator comprising:

a zero crossing point calculation unit in which said zero crossing point is calculated based on two successive samples of said FSK signal using a linear approximation;

a zero crossing point interval calculation unit;

a mark/space transition point calculation unit;

a bit point calculation unit which decides a bit point based on a mark/space transition point calculated by said mark/space transition point calculation unit; and a bit decision unit which decides a bit value based on said bit point calculated by said bit point calculation step wherein the bit value is decided during a period smaller than the full period between successive bit points so that the bit value is decided at other than a bit boundary.

14. The FSK signal demodulator as claimed in claim 13, wherein said bit point calculation unit decides said bit point value during an interval excluding predetermined interval between a predetermined point before said mark/space transition point and another predetermined point after said mark/space transition point.

15. The FSK signal demodulator as claimed in claim 13, further comprising:

an A/D converter which converts an input FSK signal to a digital FSK signal when said input FSK signal is an analog FSK signal; and a switch which selects either an output of said A/D converter or an input digital FSK signal, and supplies a selected digital FSK signal to said zero crossing point calculation unit.

16. The FSK signal demodulator as claimed in claim 14, further comprising:

an A/D converter which converts an input analog FSK signal to a digital FSK signal when said input FSK signal is an analog FSK signal; and a switch which selects either an output of said A/D converter or an input digital FSK signal, and supplies a selected digital FSK signal to said zero crossing point calculation step.

17. A testing apparatus which is used to perform a test of an information notification service function of a switching apparatus which provides the information notification service in compliance with a predetermined information notification service specification, said testing apparatus comprising:

an FSK signal demodulator which comprises;

a zero crossing point calculation unit in which said zero crossing point is calculated based on two successive samples of said FSK signal using a linear approximation;

a zero crossing point interval calculation unit;

a mark/space transition point calculation unit;

a bit point calculation unit which decides a bit point based on a mark/space transition point calculated by said mark/space transition point calculation unit; and a bit decision unit which decides a bit value based on said bit point calculated by said bit point calculation unit wherein the bit value is decided during a period smaller than the fill period between successive bit points so that the bit value is decided at other than a bit boundary.

18. The testing apparatus, as claimed in claim 17, wherein said bit point calculation unit decides said bit point value during an interval excluding predetermined interval between a predetermined point before said mark/space transition point and another predetermined point after said mark/space transition point.

19. The testing apparatus as claimed in claim 17, further comprising:

an A/D converter which converts an input FSK signal to a digital FSK signal when said input FSK signal is an analog FSK signal; and a switch which selects either an output of said A/D converter or an input digital FSK signal, and supplies a selected digital FSK signal to said zero crossing point calculation unit.

* * * * *